US007328167B1

(12) United States Patent
Kusama et al.

(10) Patent No.: US 7,328,167 B1
(45) Date of Patent: Feb. 5, 2008

(54) SERVICE RESERVATION SYSTEM

(75) Inventors: Kazuhiro Kusama, Yokohama (JP);
Kazuko Hamaguchi, Yokohama (JP);
Kenichi Yoshida, Kitamoto (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/635,630

(22) Filed: Aug. 10, 2000

(30) Foreign Application Priority Data

Sep. 21, 1999 (JP) .................................. 11-267342

(51) Int. Cl.
*G06Q 10/00* (2006.01)
(52) U.S. Cl. ......................................................... 705/5
(58) Field of Classification Search ................... 705/5, 705/8, 10, 7
See application file for complete search history.

(56) References Cited

U.S. PATENT DOCUMENTS

| 5,270,921 | A | * | 12/1993 | Hornick .......................... 705/6 |
| 5,459,656 | A | * | 10/1995 | Fields et al. .................... 705/7 |
| 5,794,172 | A | * | 8/1998 | Matheson et al. .......... 701/117 |
| 5,918,209 | A | * | 6/1999 | Campbell et al. .............. 705/5 |
| 5,933,810 | A | * | 8/1999 | Okawa .......................... 705/5 |
| 5,943,652 | A | * | 8/1999 | Sisley et al. .................... 705/9 |
| 6,119,094 | A | * | 9/2000 | Lynch et al. .................... 705/5 |
| 6,154,735 | A | * | 11/2000 | Crone .......................... 706/45 |
| 6,295,521 | B1 | * | 9/2001 | DeMarcken et al. ........... 705/6 |

FOREIGN PATENT DOCUMENTS

| JP | 09270793 | 10/1997 |
| JP | 8292987 | 11/1998 |
| JP | 11032083 | 2/1999 |

OTHER PUBLICATIONS

Kopeikin, Is ATM the future foundation of networking?, Jul. 1996, Telecommunications (International Edition), vol. 30 No. 7, pp. 33-39.*

* cited by examiner

*Primary Examiner*—C. Luke Gilligan
(74) *Attorney, Agent, or Firm*—Mattingly, Stanger, Malur & Brundidge, P.C.

(57) ABSTRACT

The degree of users' satisfaction concerning the utilization of services and the utilization efficiency of resources used for the services are optimized. The service reservation management computers deny based on the degree of importance as a standard, which increases in proportion to a level of a load of resources utilized for the service supplied by a high function network, a reservation booking request which has a degree of importance not higher than the standard, and which was received from an end user's computer via a service supply management computer, even when an amount of resources used for the service in a case where the reservation is accepted with the service then executed in accordance with the reservation booking request does not exceed an amount of resources utilizable for the service.

10 Claims, 26 Drawing Sheets

FIG. 6

| USER DISCRIMINATORS 5002 | NAME OF USERS 5003 | KIND OF MEMBERSHIP 5004 | SUBSCRIPTION SERVICE 5005 | NETWORK CONNECTION INFORMATION 5006 | ... 5001 |
|---|---|---|---|---|---|
| 1001 | HITACHI | CORPORATION | 101,102 | | ... |
| 1002 | JOHN | INDIVIDUAL STANDARD | 102,103,201,211 | | ... |
| 1003 | TOM | INDIVIDUAL ECONOMY | 103,202,212 | | ... |

FIG. 7

| SERVICE IDENTIFIER 5102 | NAME OF SERVICES 5103 | LOGICAL RESOURCES INFORMATION 5104 | SERVICE RESERVATION UNIT 5105 | SERVICE EXECUTION CONTROL UNIT 5106 |
|---|---|---|---|---|
| 101 | MULTI-POINT TELEVISION MEETING (HIGH IMAGE QUALITY) | 6.3Mbps,LOW DELAY,TVConfBridge | | |
| 102 | MULTI-POINT TELEVISION MEETING (INTERMEDIATE IMAGE QUALITY) | 1.5Mbps,LOW DELAY,TVConfBridge | | |
| 103 | MULTI-POINT TELEVISION MEETING (ECONOMY) | 100Kbps,TVConfBridge | | |
| 201 | PREVIEW OF A NEWLY PRODUCED MOTION PICTURE (HIGH IMAGE QUALITY) | 6.3Mbps,MPEGserver | | |
| 202 | PREVIEW OF A NEWLY PRODUCED MOTION PICTURE (LOW CHARGE) | 1.5Mbps,MPEGserver | | |
| 211 | MAIN COMPILATION OF A NEWLY PRODUCED MOTION PICTURE (HIGH IMAGE QUALITY) | 6.3Mbps,MPEGserver | | |
| 212 | MAIN COMPILATION OF THE NEWLY PRODUCED MOTION PICTURE (LOW CHARGE) | 1.5Mbps,MPEGserver | | |

SYNOPSIS OF SERVICE

MULTI-POINT TELEVISION MEETING (ECONOMY)

PREVIEW OF A NEWLY PRODUCED MOTION PICTURE (LOW PRICE)

| MAIN COMPILATION OF THE NEWLY | 03:00 |
| PRODUCED MOTION PICTURE (LOW CHARGE) | 18:00 |

MAKE A RESERVATION BOOKING REQUEST FOR A MULTI-POINT TELEVISION MEETING (ECONOMY)

PARTICIPANT 1   JOHN
PARTICIPANT 2   HITACHI
PARTICIPANT 3   —

STARTING TIME  4 MONTH  1 DATE  15 HOUR  00 MINUTE
ENDING TIME    4 MONTH  1 DATE  17 HOUR  00 MINUTE

APPLICATION

FIG. 15

| | |
|---|---|
| IF(TVConfBridge3.failure && startTime < currentTime+1)<br>then deny | 2620 |
| IF(TVConfBridge3.load(startTime,endTime) > 95% &&<br>    Users,HighestGrade=CORPORATION)<br>then accept, offer(TVConfBridge3.search( load < 95% h-1,+1)) | 2621 |
| IF(TVConfBridge3.load(startTime,endTime) > 95% &&<br>    Users,HighestGrade=INDIVIDUAL, GENERAL, )<br>then deny, offer    (TVConfBridge3.search( load < 95% h-4,+4)) | 2622 |
| IF(TVConfBridge3.load(startTime,endTime) > 95% &&<br>    Users,HighestGrade=INDIVIDUAL, ECONOMY )<br>then deny, offer    (TVConfBridge3.search( load < 80% h-4,+4)) | 2623 |
| IF(TVConfBridge3.load(startTime,endTime) > 80% &&<br>    Users,HighestGrade=CORPORATION )<br>then accept | 2624 |
| IF(TVConfBridge3.load(startTime,endTime) > 80% &&<br>    Users,HighestGrade=INDIVIDUAL, GENERAL )<br>then accept, offer    (TVConfBridge3.search( load < 80% h-4,+4)) | 2625 |
| IF(TVConfBridge3.load(startTime,endTime) > 80% &&<br>    Users,HighestGrade=INDIVIDUAL, ECONOMY )<br>then deny, offer    (TVConfBridge3.search( load < 80% h-4,+4)) | 2626 |
| IF(TVConfBridge3.load(startTime,endTime) > 50% &&<br>    Users,HighestGrade=CORPORATION )<br>then accept | 2627 |
| IF(TVConfBridge3.load(startTime,endTime) > 50% &&<br>    Users,HighestGrade=INDIVIDUAL, GENERAL )<br>then accept | 2628 |
| IF(TVConfBridge3.load(startTime,endTime) > 50% &&<br>    Users,HighestGrade=INDIVIDUAL, GENERAL )<br>then accept, offer  (TVConfBridge3.search( load < 80% h-4,+4)) | 2629 |
| Default:<br>accept | 2630 |

FIG. 16

| LOGICAL RESOURCES | PHYSICAL RESOURCES DISCRIMINATOR | COMPUTER DISCRIMINATOR | NAME OF ATTRIBUTE 1 | ATTRIBUTE VALUE 1 | NAME OF ATTRIBUTE 2 | ATTRIBUTE VALUE 2 | NAME OF ATTRIBUTE 3 | ATTRIBUTE VALUE 3 |
|---|---|---|---|---|---|---|---|---|
| MPEG2CacheOnDemand | MPEG2CacheOnDemand_1 | MPEGCache_1 | RECEIVABLE NUMBER OF RESERVATION | 10 | MAXIMUM TRANSFER SPEED | 6Mbps | MAXIMUM NUMBER OF CLIENTS | 5 |
| MPEG2CacheBroadcast | MPEG2CacheBroadcast_1 | MPEGCache_2 | RECEIVABLE NUMBER OF RESERVATION | 5 | MAXIMUM TRANSFER SPEED | 6Mbps | MAXIMUM NUMBER OF CLIENTS | 100 |
| MPEG1CacheOnDemand | MPEG1Cache_1 | MPEGCache_1 | RECEIVABLE NUMBER OF RESERVATION | 10 | MAXIMUM TRANSFER SPEED | 1.5Mbps | MAXIMUM NUMBER OF CLIENTS | 20 |
| MPEG1CacheBroadcast | MPEG1Cache_1 | MPEGCache_2 | RECEIVABLE NUMBER OF RESERVATION | 5 | MAXIMUM TRANSFER SPEED | 1.5Mbps | MAXIMUM NUMBER OF CLIENTS | 20 |

FIG. 17

| Logical Resources | Physical Resources Discriminator | Computer Discriminator | Name of Attribute 1 | Attribute Value 1 | Name of Attribute 2 | Attribute Value 2 | Name of Attribute 3 | Attribute Value 3 |
|---|---|---|---|---|---|---|---|---|
| TVConfBridge1 | TVConfBridge1_1 | TVConfBridge1 | Receivable Number of Reservation | 10 | Maximum Number of Connection | 10 | Maximum Transfer Speed | 6Mbps |
| TVConfBridge1 | TVConfBridge1_2 | TVConfBridge2 | Receivable Number of Reservation | 5 | Maximum Number of Connection | 5 | Maximum Transfer Speed | 6Mbps |
| TVConfBridge2 | TVConfBridge2_1 | TVConfBridge1 | Receivable Number of Reservation | 10 | Maximum Number of Connection | 10 | Maximum Transfer Speed | 1.5Mbps |
| TVConfBridge2 | TVConfBridge2_2 | TVConfBridge2 | Receivable Number of Reservation | 5 | Maximum Number of Connection | 5 | Maximum Transfer Speed | 1.5Mbps |
| TVConfBridge3 | TVConfBridge3_1 | TVConfBridge1 | Receivable Number of Reservation | 10 | Maximum Number of Connection | 10 | Maximum Transfer Speed | 100Kbps |
| TVConfBridge3 | TVConfBridge3_2 | TVConfBridge2 | Receivable Number of Reservation | 5 | Maximum Number of Connection | 5 | Maximum Transfer Speed | 100Kbps |
| SuperImpose1 | SuperImpose1_1 | SuperImpose1 | Receivable Number of Reservation | 10 | Maximum Image Transfer Speed | 6Mbps | | |
| SuperImpose2 | SuperImpose2_1 | SuperImpose2 | Receivable Number of Reservation | 10 | Maximum Image Transfer Speed | 1.5Mbps | | |

FIG. 18

| RESERVATION NUMBER | RESERVATION TYPE | PHYSICAL CONNECTION INFORMATION | STARTING DATE AND TIME | ENDING DATE AND TIME |
|---|---|---|---|---|
| 1001 | REAL RESERVATION | 133.144.98.80, 133.144.99.82 —5Mbps→ MPEGCache1 —52Mbps→ 133.144.100.10; SuperImpose1_1 —5Mbps | 1999/4/1 11:50 | 1999/4/1 11:6 |
| 1002 | REAL RESERVATION | 133.144.98.85 —100kbps→ TVConfBridge3_1; MPEGCache1 | 1999/4/1 12:00 | 1999/4/1 13:00 |
| 1003 | TENTATIVE RESERVATION | 133.144.98.85 —100kbps→ TVConfBridge3_2 —100kbps→ 133.144.99.5, 133.144.99.10 | 1999/4/1 9:00 | 1999/4/1 10:30 |
| 1004 | TENTATIVE RESERVATION | 133.144.98.85 —100kbps→ TVConfBridge3_2 —100kbps→ 133.144.99.5, 133.144.99.10 | 1999/4/1 9:00 | 1999/4/1 10:30 |
| 1005 | TENTATIVE RESERVATION | 133.144.98.85 —100kbps→ TVConfBridge3_2 —100kbps→ 133.144.99.5, 133.144.99.10 | 1999/4/1 10:30 | 1999/4/1 12:00 |

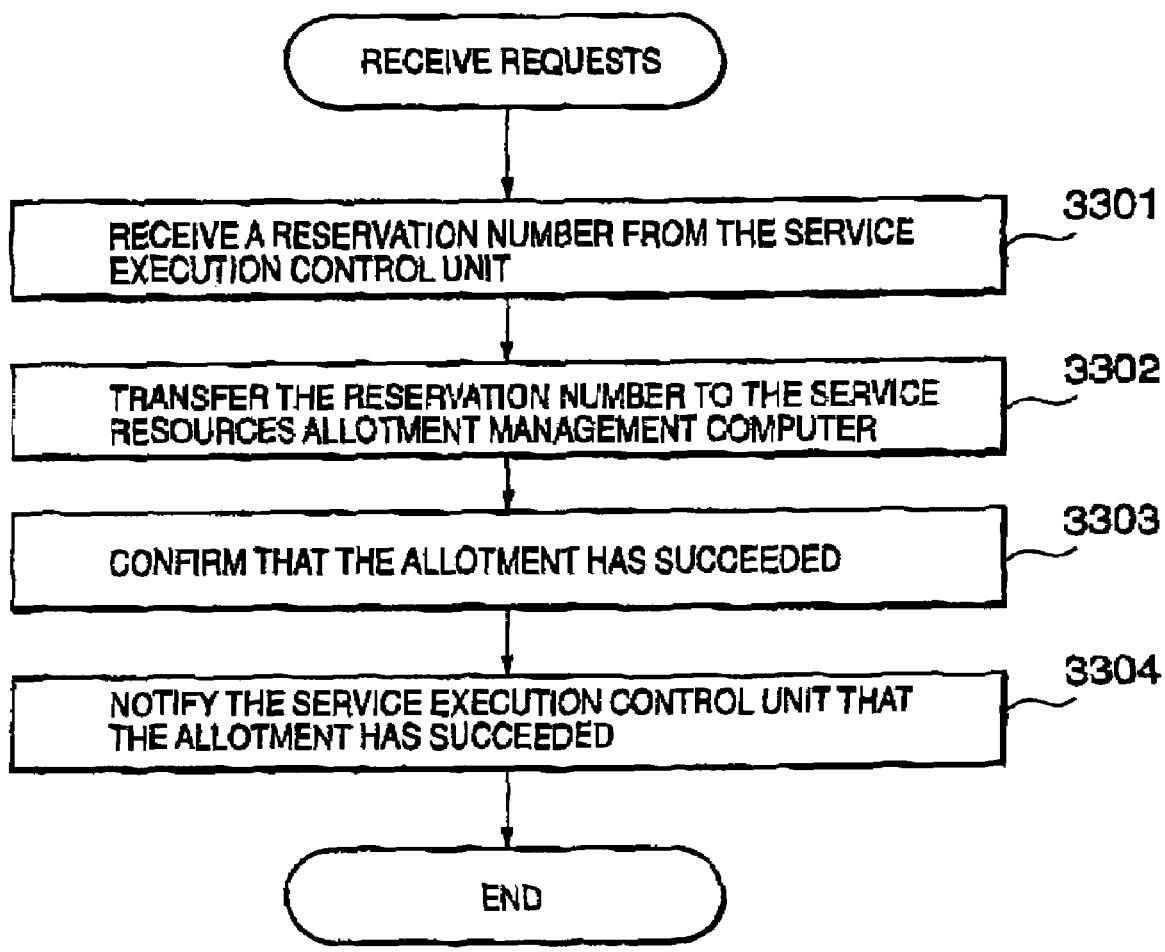

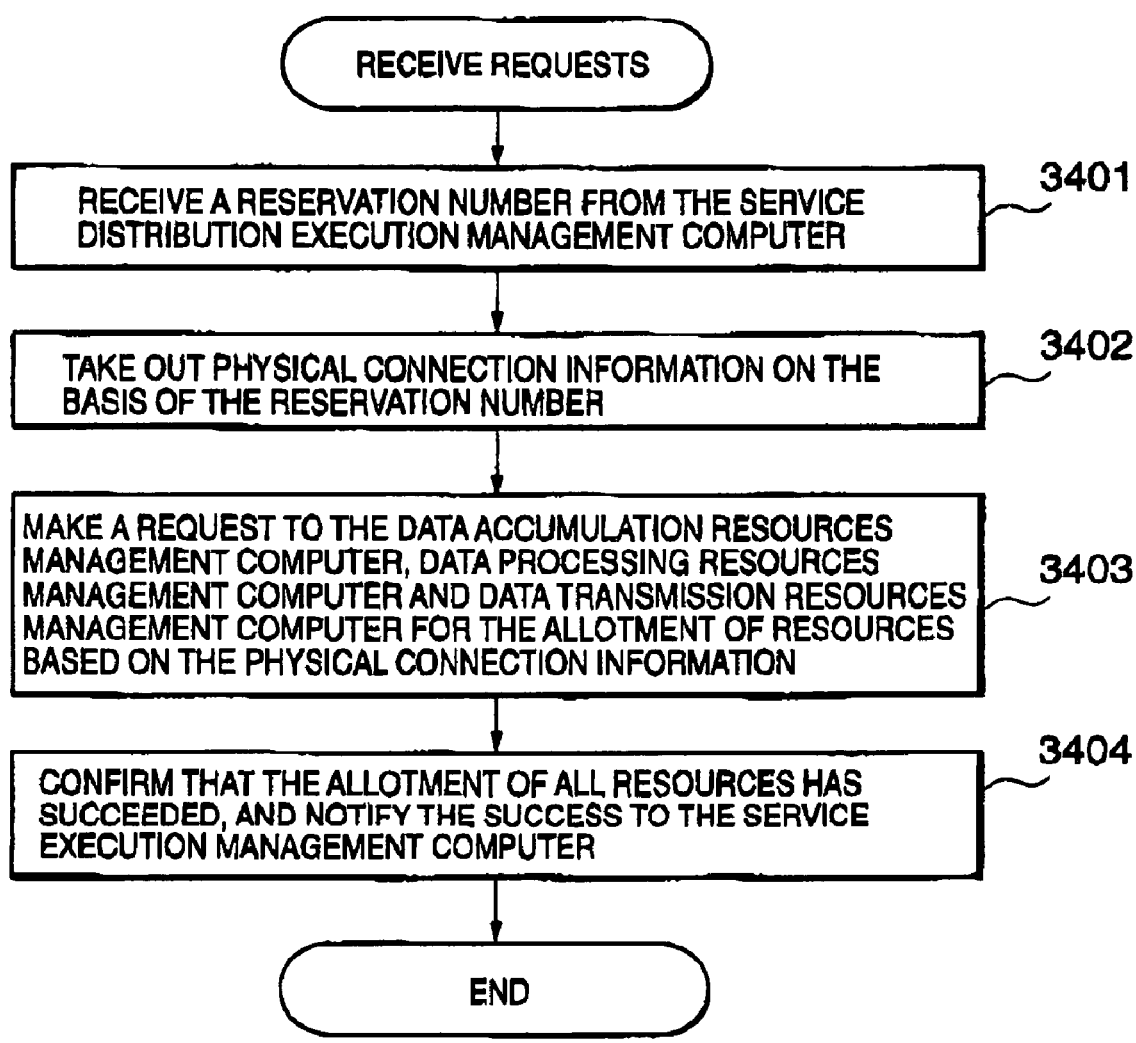

SERVICE RESERVATION SYSTEM

This application claims a priority based on Japanese Patent Application No. 11-267342 filed on Sep. 21, 1999, the entire contents thereof are incorporated herein by reference for all purposes.

BACKGROUND OF THE INVENTION

This invention relates to the techniques for managing the resources used to supply network-utilized services.

DESCRIPTION OF THE RELATED ART

In recent years, a high function network is being materialized. In such a network, high-order services constituting an information platform for processing and accumulating information are added to a network which supplies as services basic information distribution, such as the real time transmission and exchange of transparent information. Namely, the function of a high-order layer, such as an application layer on an OSI model is added to a traditional network represented by a line switching network, a packet switching network and an IP network and substantially having the function of the layers 1-3 of the OSI model.

In a network, especially, in the above-described high function network, how to distribute the resources, which are used to supply network-utilized services, to users poses problems.

For example, a service for supplying the contents of data, which are formed of video data, such as a motion picture, received from a provider thereof and accumulated, and supplied to plural users in accordance with the users' requests by utilizing a network will be discussed. The users' requests are concentrated on a time zone, for example, 20:00-21:00 during which many ordinary people enjoy a motion picture.

If a necessary amount of resources for a network for transmitting the contents of data to users are prepared in accordance with a time zone on which the users' requests for reservation are concentrated, an amount of resources which are not used in other time zones will increase, so that a general resource utilization efficiency will decrease. On the other hand, if only a smaller amount of resources are prepared, the resource utilization efficiency is improved but the number of users' requests for reservation denied in a time zone on which the user's requests for reservation are concentrated will increase. This will cause the degree of users' satisfaction concerning the services to lower. Especially, the utilization of the services comes to be denied at the very time at which a request for reservation is actually made, i.e., at the very time at which the users actually utilize the services. Therefore, the degree of dissatisfaction concerning the services of the users who made a plan premising that they utilize the services will increase.

Therefore, in order to prevent a decrease in the degree of users' satisfaction concerning the services while heightening the resource utilization efficiency, a method of taking users' reservations in advance, and supplying services within the range of the reservations practically taken has been proposed. According to such a method of taking reservations in advance, the users can know in advance whether the services can be utilized or not, and make a plan in accordance with the results of the practicing of the method. Therefore, the users' dissatisfaction caused by the denial of the utilization of the services at the very time at which the users actually desire to utilize the services can be eliminated.

In order to take such reservations, it is necessary to limit the number of the reservations so that the amount of resources used to supply the reserved services does not exceed that of the utilizable resources. In order to limit the number of reservations, it is necessary to discriminate the reservations to be taken and those to be denied from each other in accordance with a certain priority item.

The methods of determining preferential reservations include a method of giving priority to earlier-accepted reservations, and such a method as is defined in the techniques disclosed in Japanese Patent Laid-Open No. 292987/1996, i.e. a method having the steps of determining the degree of importance of the reservations on the basis of the personal information on the users, and taking reservations with priority given to the reservations of higher degrees of importance.

When earlier-accepted reservations are taken preferentially in a method in which reservations are taken in advance to supply services within the range of the reservations taken, later-accepted reservations of higher degrees of importance are denied in some cases. In this case, the dissatisfaction of the users the reservations of whom have been denied in spite of the high importance thereof increases.

According to the method of preferentially taking reservations of higher degrees of importance, the necessity of denying already-accepted reservations occurs so as to accept requests, which are made afterward, for reservations the degrees of importance of which are higher than those of the already-accepted reservations. In such a case, the dissatisfaction of users whose reservations once accepted have been denied increases.

In order to improve the resource utilization rate, it is necessary that the utilization of services be leveled with respect to both the time and resources. However, when the determination of the contents of the reservations of services has been left to the users who cannot grasp the general condition of reservations, it is impossible to expect the leveling of sufficient or efficient utilization of resources.

SUMMARY OF THE INVENTION

Therefore, the present invention aims at optimizing the resource utilization rate and the degree of satisfaction of users concerning the utilization of services.

To be exact, the present invention aims at, for example, supplying services so as not to cause the degree of users' satisfaction concerning the utilization of the services to decrease with a predetermined high resource utilization efficiency maintained, or at leveling the users' utilization of the services with the supplying of services with which users are satisfied to a predetermined extent.

The present invention provides a service reservation system capable of eliminating these problems, and adapted to accept from users requests for reservations for utilizing services supplied by using resources.

The service reservation system is provided with a reservation condition management element adapted to manage accepted reservations of services as reservation condition, an acceptance element adapted to accept service booking requests from users, an importance determining element for determining in accordance with preset specifications the degree of importance of the service booking requests accepted by the acceptance element, and a reservation taking element adapted to deny the acceptance of the service booking requests if the degree of importance of the service booking requests determined by the importance degree determining element is lower than a predetermined importance degree determined by a predetermined standard, and to permit the acceptance of the service booking requests if the degree of importance of the service booking requests determined by the importance determining element is not lower than the predetermined degree, when a load level of resources used for supplying object services of the service booking requests accepted by the acceptance element and determined depending upon the reservation condition managed by the reservation condition management element is higher than a predetermined level.

The resources referred to above include resources in every meaning of the word which are used in the supplying of services, such as time resources, physical resources and logical resources.

According to the service supplying system, a predetermined load range of resources is secured for the service booking requests of a higher degree of importance. Therefore, the service booking requests of a high degree of importance can be accepted at a high probability without canceling the service booking requests of a low degree of importance after the requests have once been accepted.

According to another aspect of the present invention, the service reservation system is provided with a reservation condition management element adapted to manage accepted reservations of services as reservation condition, a first acceptance element adapted to accept service booking requests from users, a substitute reservation plan preparation element adapted to prepare at least one substitute reservation plan, which is obtained by at least partially altering the contents of reservation in the reservation booking requests accepted by the first acceptance element, in such a manner that a general resources utilization efficiency increases, in accordance with the contents of the reservation and a load level of resources used for the supplying of the object services of the reservation booking requests, said load level being determined by the reservation condition managed by the reservation condition management element, a substitute reservation plan presentation element adapted to present at least one substitute reservation plan prepared by the substitute reservation plan preparation element, to the users, a second acceptance element adapted to accept the users' selection of the at least one substitute reservation plan, and a reservation element adapted to accept as reservation the substitute reservation plan whose selection is accepted by the second selection acceptance element.

According to the service reservation system, a substitute reservation plan is prepared which enables a general resource utilization efficiency to increase in accordance with the load level of resources used for the supplying of the object services of the reservation booking requests and the contents of the reservation requested by the users, and the utilization of the services according to the substitute reservation plan is recommended to the users, whereby it becomes possible to induce the users to make reservation of the services according to the substitute reservation plan and thereby increase the resource utilization efficiency. When this substitute reservation plan in this system is prepared so that the plan has parts in which much consideration is given to the contents of reservation requested by the users, in accordance with the contents concerned, the degree of users' satisfaction can be secured to a certain extent.

Therefore, according to the present invention, the reservation of services in which the resource utilization efficiency and the degree of users' satisfaction concerning the utilization of the services are optimized can be attained.

BRIEF DESCRIPTION OF THE DRAWINGS

Preferred embodiments of the present invention will be described in detail on the basis of the following figures, wherein:

FIG. 6 is a diagram showing contents of a users' attribute table in the embodiment of the present invention;

FIG. 7 is a diagram showing contents of a service attribute table in the embodiment of the present invention;

FIG. 8 is a diagram showing a screen displaying the synopsis of reservation-acceptable services in the embodiment of the present invention;

FIG. 10 is a diagram showing an initial screen for the reservation of services in the embodiment of the present invention;

FIG. 15 is a diagram showing a service operating policy in the embodiment of the present invention;

FIG. 16 is a diagram showing contents of a data accumulation resource management table in the embodiment of the present invention;

FIG. 17 is a diagram showing contents of a data producing resources management table in the embodiment of the present invention;

FIG. 18 is a diagram showing contents of a reservation management table in the embodiment of the present invention;

FIG. 25 is a flow chart showing a procedure of a processing operation of a service execution management computer in the service execution control sequence in the embodiment of the present invention; and FIG. 26 is a flow chart showing a procedure of a processing operation of the service resources allotment management computer in the service execution control sequence in the embodiment of the present invention.

DESCRIPTION OF THE PREFERRED EMBODIMENTS

An embodiment of the present invention will now be described.

Figure 1:
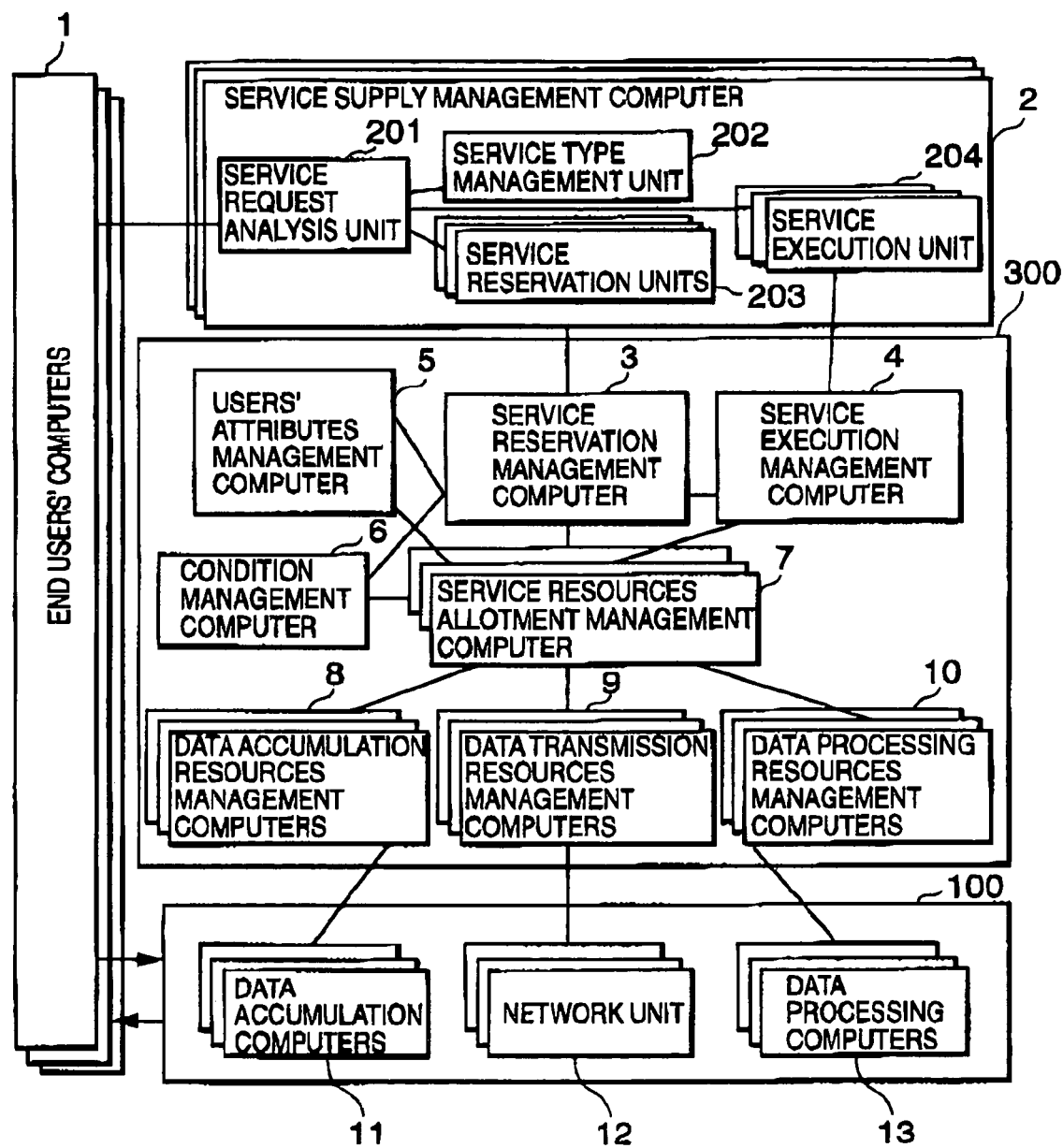
FIG. 1 is a block diagram showing the configuration of an embodiment of the service supply system according to the present invention.

FIG. 1 shows the configuration of an embodiment of the service supply system according to the present invention.

As shown in the figure, the service supply system of this embodiment has a high function network 100, end users' computers 1 utilizing the service supplied by the high function network 100, a management computer group 300 adapted to manage and process various kinds of condition concerning the supplying of services, and a service supply management computer 2 adapted to control the reservation and execution of services.

The management computer group 300 includes a service reservation management computer 3, a service execution management computer 4, a users' attributes management computer 5, a condition management computer 6, service resources allotment management computers 7, data accumulation resources management computers 8, data transmission resources management computers 9, and data processing resources management computers 10.

The high function network 100 has network units 12, data accumulation computers 11, and data processing computers 13.

The service supply management computer 2 has a request for service analysis unit 201, a service type management unit 202, service reservation units 203, and service execution control units 204.

Each part of the high function network 100 will now be described.

Each network unit 12 is adapted to supply transmission and exchange services to the end users' computers 1. To be exact, an ATM net, an ISDN net, an analog telephone net, a portable telephone net, a private line net, a frame relay net, an IP net, an SDH net, a satellite communication net, a CATV net, or a combination thereof corresponds to the network unit 12.

Figure 2:
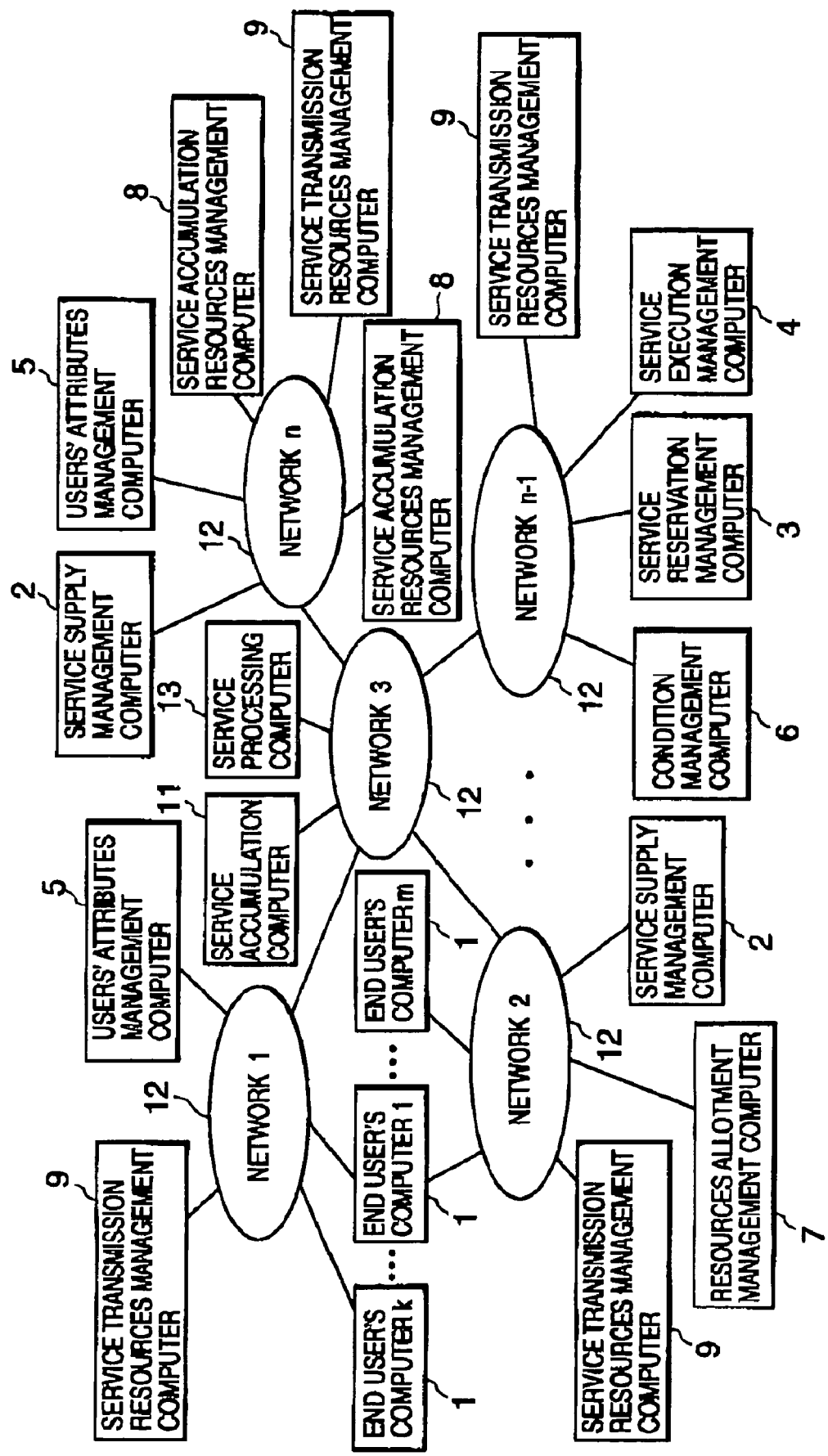
FIG. 2 is a block diagram showing a concrete example of the configuration of the embodiment of the service supply system according to the present invention.

FIG. 2 shows an example of the configuration of the service supply system of FIG. 1 in a case where the network unit 12 is formed of plural transmission and exchange networks 1-n connected with each other.

Referring to FIG. 2, the end users' computers 1 are connected to a single or plural transmission and exchange networks. The end users' computers 1 can suitably use an arbitrary transmission and exchange network connected thereto. In the example of FIG. 2, each computer in the management computer group 300, service supply management computer 2 and end users' computers 1 are connected together via the transmission and exchange network constituting the network unit 12, whereby the service supply management computer 2 and end users' computers 1; the service supply management computer 2 and each computer in the management computer group 300; and the computers in the management computer group 300 are set communicable with each other via the network unit 12. The communication between these parts may also be rendered possible not via the network units 12 in the high function network 100 but via other transmission and exchange network. FIG. 2 shows an example in which the function of each computer in the management computer group 300 shown in FIG. 1 is attained by distributed processing of the plural computers shown by the same reference numerals. The functions of these computers may also be attained by concentrated processing of a single computer.

The resources for the high function network 100 used for a service supplying operation of such network units 12 constitute, for example, transmission power, such as a transmission capacity of the network units 12.

The data accumulation computer 11 is adapted to accumulate data temporarily or permanently, and supply the service for distributing the accumulated data by utilizing the transmission and exchange service supplied by the network units 12 to the end user computers 1. To be exact, an electronic mail server, a WWW proxy server, a cash server for domain name service, or a video cash server for distributing an image, which is sent by a user and temporarily stored, in accordance with a request made by a user correspond to the data accumulation computer 11.

Resources for the high function network 100 used for the supplying of services by the data accumulation computer 11 include resources for the accumulation capacity, transfer capacity and simultaneous distribution capacity of the data accumulation computer 11, and resources used for service supplying operations of the network units 12.

The data processing computer 13 is a computer having a data processing function. To be exact, the data processing computer 13 is an apparatus for carrying out the contraction and expansion of a video, synthesis of plural images, synthesis of plural voices, superposition of letters on an image, conversion of the color of an image, and encoding and decoding of an image. For example, a television meeting bridge which attains a multi-point television meeting by carrying out the synthesis of plural images and plural voices corresponds to this apparatus.

Resources for the high function network 100 used for the supplying of service by the data processing computer 13 constitute both the resources for transfer capacity and processing capacity of the data processing computer 13, and resources used for service supplying operations of the network unit 12.

Each part of the management computer group 300 will now be described.

The users' attributes management computer 5 is adapted to hold attributes of end users and end users' computers 1.

The condition management computer 6 is adapted to manage, concerning every service, an actual reservation condition, and a load of logical resources for the high function network 100 in the actual reservation condition, i.e. a load of logical resources at each point in time for the high function network 100 in a case where the supplying of services is executed in accordance with the contents of the reservation.

The data accumulation resources management computers 8 are adapted to manage a condition of use of resources of the data accumulation computers 11 which will be described later.

The data transmission and resources management computers 9 are adapted to manage a condition of use of resources of the network units 12 which will be described later.

The data processing resources management computers 10 are adapted to manage a condition of use of resources for the data processing computers 13 which will be described later.

The service resources allotment management computers 7 are adapted to allot services to be reserved or executed to respective resources of the high function network 100.

The service reservation management computer 3 is adapted to determine whether requested reservation is acceptable or denied while utilizing the service resources allotment management computers 7, and present a substitute plan which will be described later.

The service execution management computer 4 is adapted to determine whether execution of requested services is acceptable or denied while utilizing the service resources allotment management computers 7.

Each part of the service supply management computer 2 will now be described.

The service reservation units 203 are provided correspondingly to the kinds of services supplied by the high function network 100, and adapted to process requests for reservation received from the end users' computers 1 while utilizing the service reservation management computer 3.

The service execution control units 204 are provided correspondingly to the kinds of services supplied by the high function network 100, and adapted to process the requests for the execution of the services received from the end users' computers 1 while utilizing the service execution management computer 4.

The service request analysis unit 201 is adapted to analyze contents of reservation of services and those of requests for execution of the services received from the end users' computers 1.

The service type management unit 202 is adapted to manage services supplied by the high function network 100, logical levels of resources used for each service type, and the operations of the service reservation units 203 and service execution control units 204 which correspond to the kinds of services.

Figure 3:
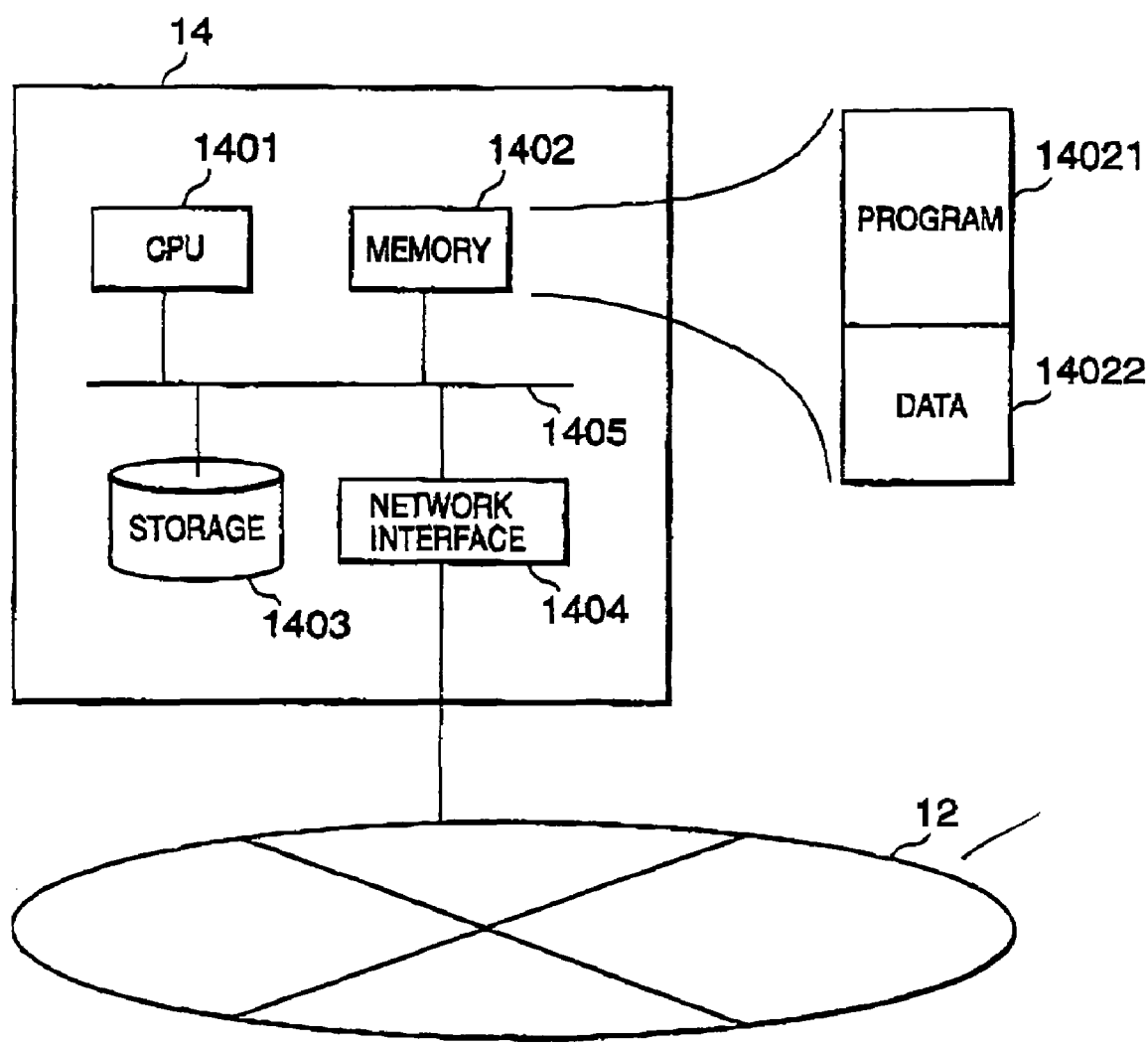
FIG. 3 is a block diagram showing the configuration of an electronic computer capable of being used as hardware of each computer in the embodiment of the present invention.

In that configuration, a hardware structure of each of these computers can employ a structure of a general computer 14 having a CPU 1401, a memory 1402, a storage 1403, a network 333 interface 1404 and a bus 1405 which are shown, for example, in FIG. 3. In this structure, a program 14021 and data 14022 supplied via a removable storage medium or network are stored in the memory 1402. When the CPU 1401 executes the program 14021, the processing of each part of each of the computers which will be described below is attained while the data 14022 are utilized.

An operation of the service supply system will now be described.

The operations of the service supply system of this embodiment are divided into three, i.e. a reservation service selection receiving operation, a service reservation operation and a reservation service execution control operation.

First, the reservation service selection receiving operation will be described.

Figure 4:
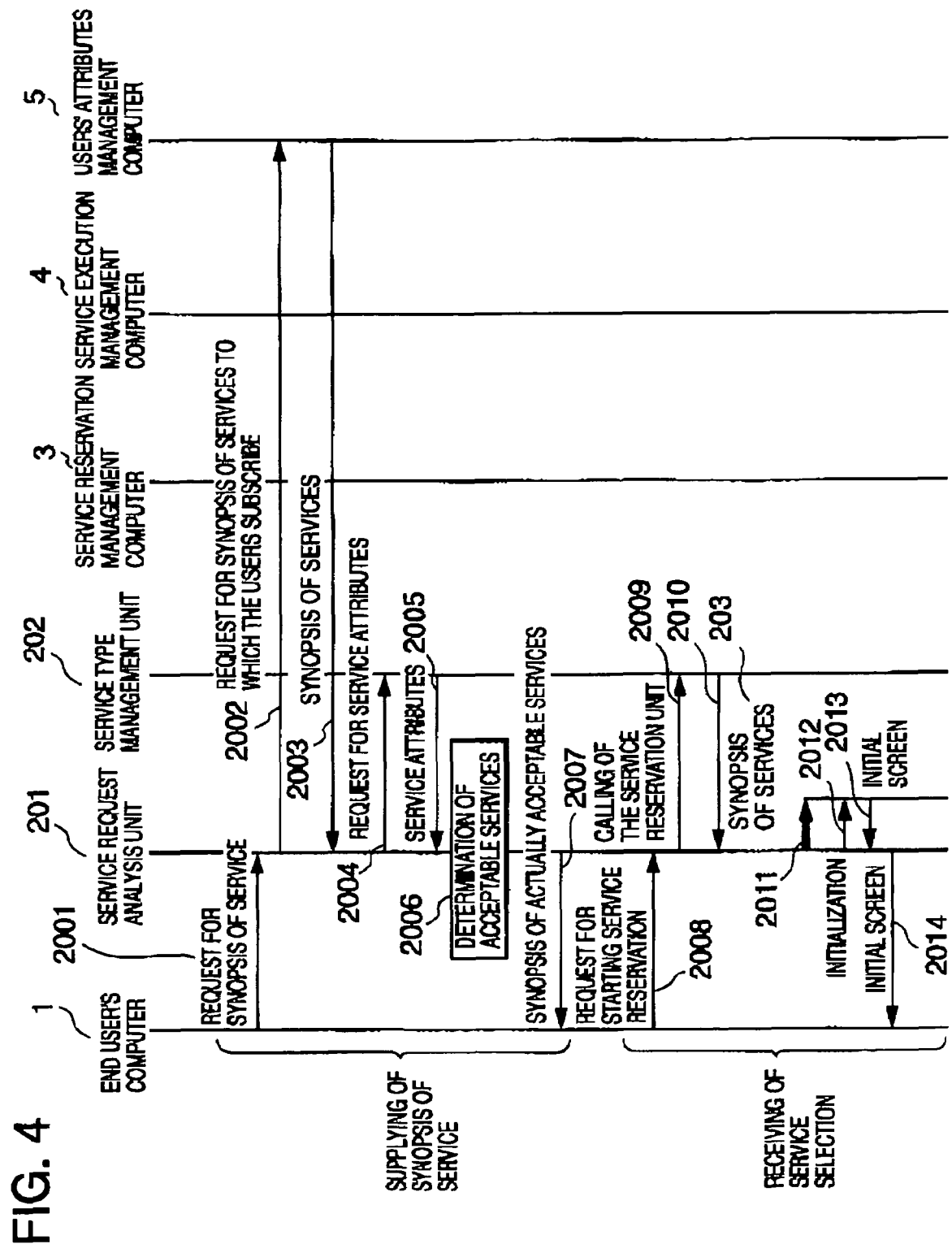
FIG. 4 illustrates a processing sequence of each part in a reserved service selection receiving operation of an embodiment of the present invention.

FIG. 4 shows a processing sequence of each part in the reservation service selection receiving operation.

As shown in the figure, the reservation service selection receiving operation is attained by a service synopsis supplying sequence and a service selection receiving sequence.

First, the service synopsis supplying sequence will be described.

Figure 5:
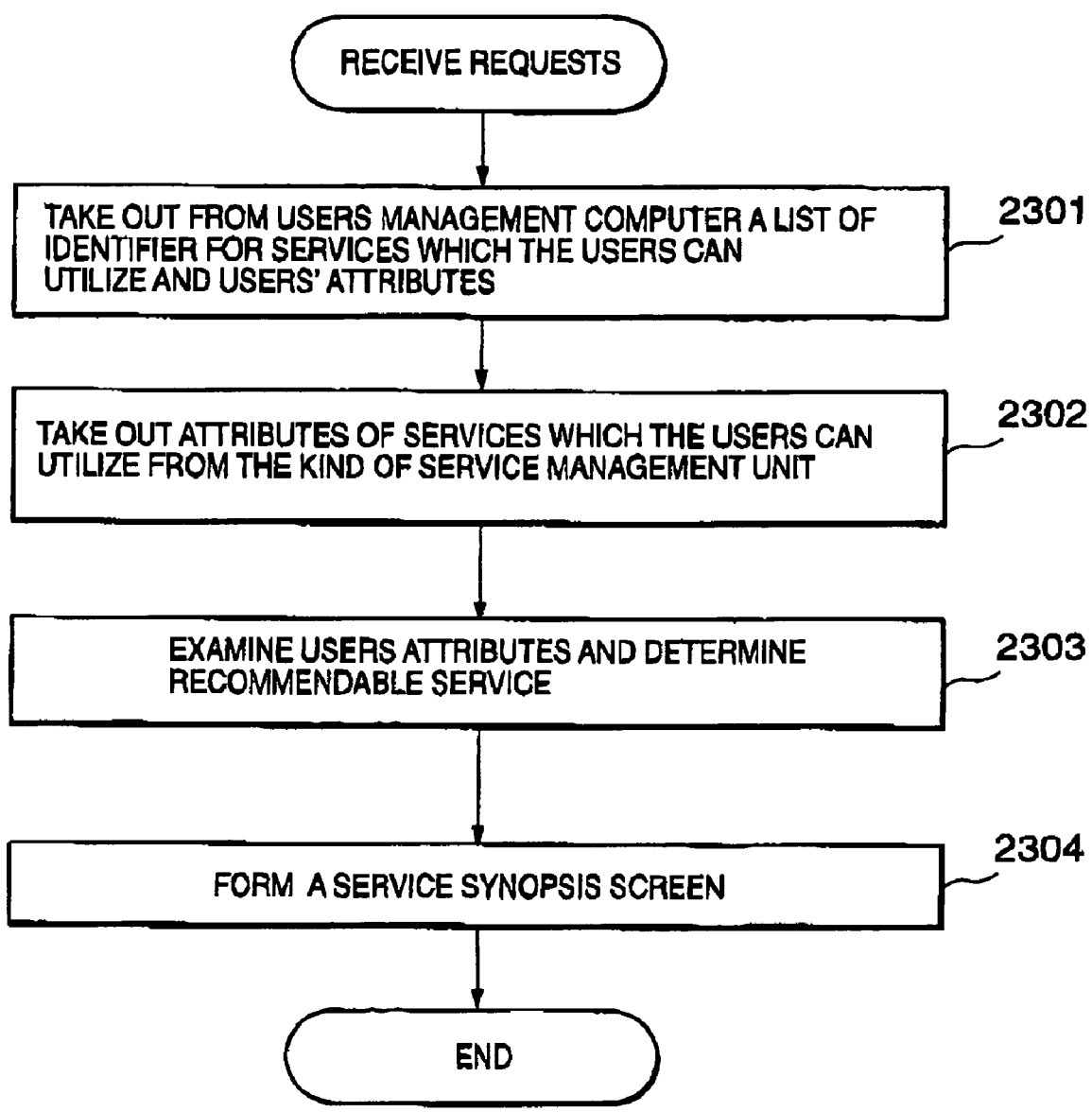
FIG. 5 is a flow chart showing a procedure of a processing operation of a request for service analysis unit in a service synopsis providing sequence in the embodiment of the present invention.

FIG. 5 shows a procedure of a processing operation of the request for service analysis unit 201 in the service synopsis supplying sequence.

In order to make a booking of services with reference to FIG. 4, the end users' computers 1 transmit a request for synopsis of service to the request for service analysis unit 201 of the service supply management computer 2 (2001). The request for service analysis unit 201 transfers the requests to the users' attribute management computer 5 (2002) (Step 2301 of FIG. 5).

The users' attribute management computer 5 holds a users' attribute table 5001 shown in FIG. 6. As shown in the figure, on the users' attribute table 5001, information which includes a users' discriminator 5002 peculiar to the user, a users' name 5003, membership type 5004 representative of users type, a service discriminator 5005 representative of the services which the user subscribes, and network connection information 5006 indicating a position (address etc.) of the and user computers 1 on a transmission and exchange network attained by the network units 12 is register d as user's attributes for each of all users. For example, the user's name "Tom", the kind of membership "Personal, economy" and the service discriminator "103, 202, 212" are registered for the user having a user's identifier "1003".

The users attributes management computer 5, upon receipt of the request for synopsis of service, reads out from the users' attribute table 5001 the service discriminator and the kind of membership both of which are corresponding to the user's discriminator of the user who made the request, to deliver them to the request for service analysis unit 201 (2003). For example, the service discriminator "103, 202, 212" and the membership type "Personal, economy" are delivered to the request for service analysis unit 201 concerning the user having the user identifier "1003".

The request for service analysis unit 201 transmits a request for the name of service, which corresponds to the service discriminator delivered thereto by the users' attributes management computer 5 to the service type management unit 202 (2004, 2005)(Step 2302 of FIG. 5).

The service type management unit 202 holds a service attributes table 5101 shown in FIG. 7. As shown in the figure, on the service attributes table 5101 which includes service identifier 5102, service name 5103, which includes service identifiers 5102, service name 5103, logical resource information 5104 representative of the logical resources for the high function network 100 used for supplying the service, and information 5105, 5106 on the service reservation units 203 and service execution control units 204 which correspond to the service, is registered, as service attributes, for each of all services supplied by the high function network 100.

In the service supply system of this embodiment, the resources used to supply one service type on each data processing computer 13 and each data accumulation computer 11 are managed as a unit of physical resources. A group of physical resources for supplying the same service types is managed as a unit of logical resources. Concerning the network units 12, transmission capacity and transmission quality used to supply one service type are managed as logical resources, and individual transmission and exchange network forming a network unit 12 is managed as a unit of physical resources.

The service type management unit 202 retrieves from this service attributes table 5101 the service names registered with respect to the service discriminator is delivered from the request for service analysis unit 201 to deliver them to the request for service analysis unit 201. For example, with respect to the service discriminator "103, 202, 212" user identifier "1003", the service names "Multi-point television meeting economy, Newly produced motion picture low-price previewing service, and Low-price service for viewing a real compilation of the newly produced motion picture" are delivered to the request for service analysis unit 201.

On the basis of the service name and the membership type, the request for service analysis unit 201 determines contents of reservation which is acceptable for the user who made the request for synopsis of service (2006)(Step 2303 of FIG. 5). In this step, for example, time zone of utilization of each service are limited for each membership type, whereby only the requests for reservation for the limited time zone of utilization are rendered acceptable. To be exact, with respect to the user having the user identifier "1003" and the membership type "Personal economy", the service utilization time zone of the reservation for the low-price service for viewing a real compilation of a newly produced motion picture is limited to 3:00-18:00. What to be used as users' attributes and service attributes and how to determine with respect to the users the acceptable contents of reservation on the basis of these users' and service attributes may be set arbitrarily in accordance with the environment of the service supply system and services to be supplied and the uses thereof.

The request for service analysis unit 201 forms a synopsis of the names of the determined services (Step 2304 of FIG. 5), and returns the synopsis to the end users' computers 1 (2007). The end users' computers 1 display as shown in, for example, FIG. 8 a synopsis of services whose reservation are acceptable services on a screen 5201, and thereby notify the users of the synopsis.

The above is a description of the service synopsis supplying sequence.

The service selection receiving sequence will now be described.

Figure 9:
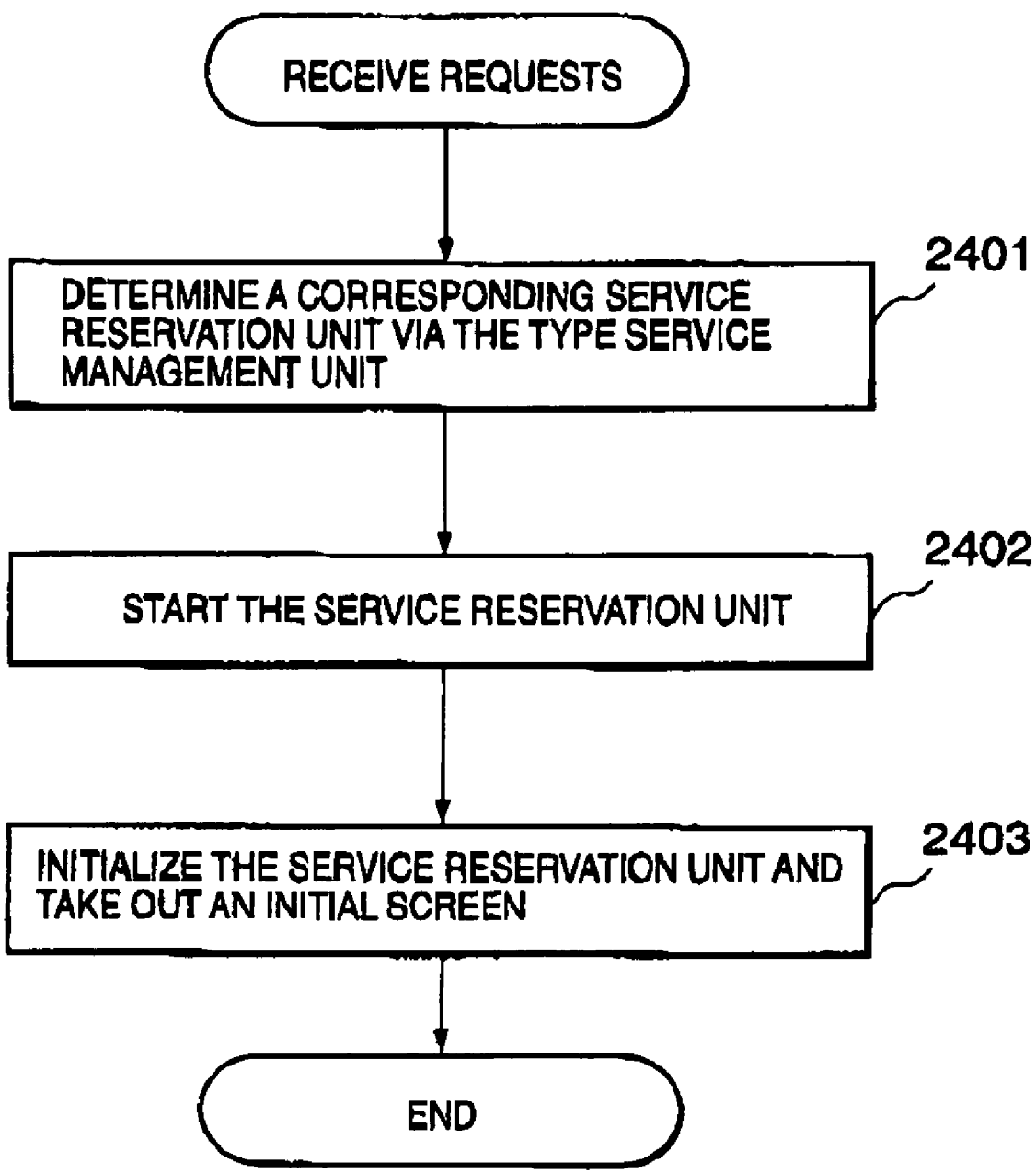
FIG. 9 is a flow chart showing a procedure of a processing operation of the request for service analysis unit in a service selection accepting sequence in the embodiment of the present invention.

FIG. 9 shows a procedure of a processing operation of the request for service analysis unit 201 in the service selection receiving sequence.

Referring to FIG. 4, when something in the synopsis of service obtained in the service synopsis supplying sequence is designated by the user, the end user's computer 1 transmits a request for starting of a reservation making operation for the designated service to the request for the request for service analysis unit 201 (2008).

In response to this request for service analysis unit 201 obtains information on the service reservation unit 203 corresponding to the designated service, from the service type management unit 202 (2009, 2010) (Step 2401 of FIG. 9). The service reservation unit 203 specified by the information thus obtained is started (2011)(Step 2402 of FIG. 9), and then initialized (2012)(Step 2403 of FIG. 9).

The initialized service reservation unit 203 forms such an initial screen 5301 for service reservation as shown in, for example, FIG. 10, and delivers the screen to the request for service analysis unit 201, so as to accept requests for reservation of the corresponding service (2013).

The above initial screen 5301 for service reservation of FIG. 10 is a screen for accepting requests for reservation of the service of multi-point television meeting, economy. This screen is used to accept participants in and starting and finishing time of the multi-point television meeting, economy from the users.

When the request for service analysis unit 201 receives the initial screen 5301 for service reservation from the service reservation unit 203, the analysis unit transfers the screen to the end users' computers 1 (2014). The end users' computers 1 display the received initial screen 5301 for service reservation.

The above is a description of the service selection receiving sequence.

The service reservation making operation will now be described.

Figure 11:
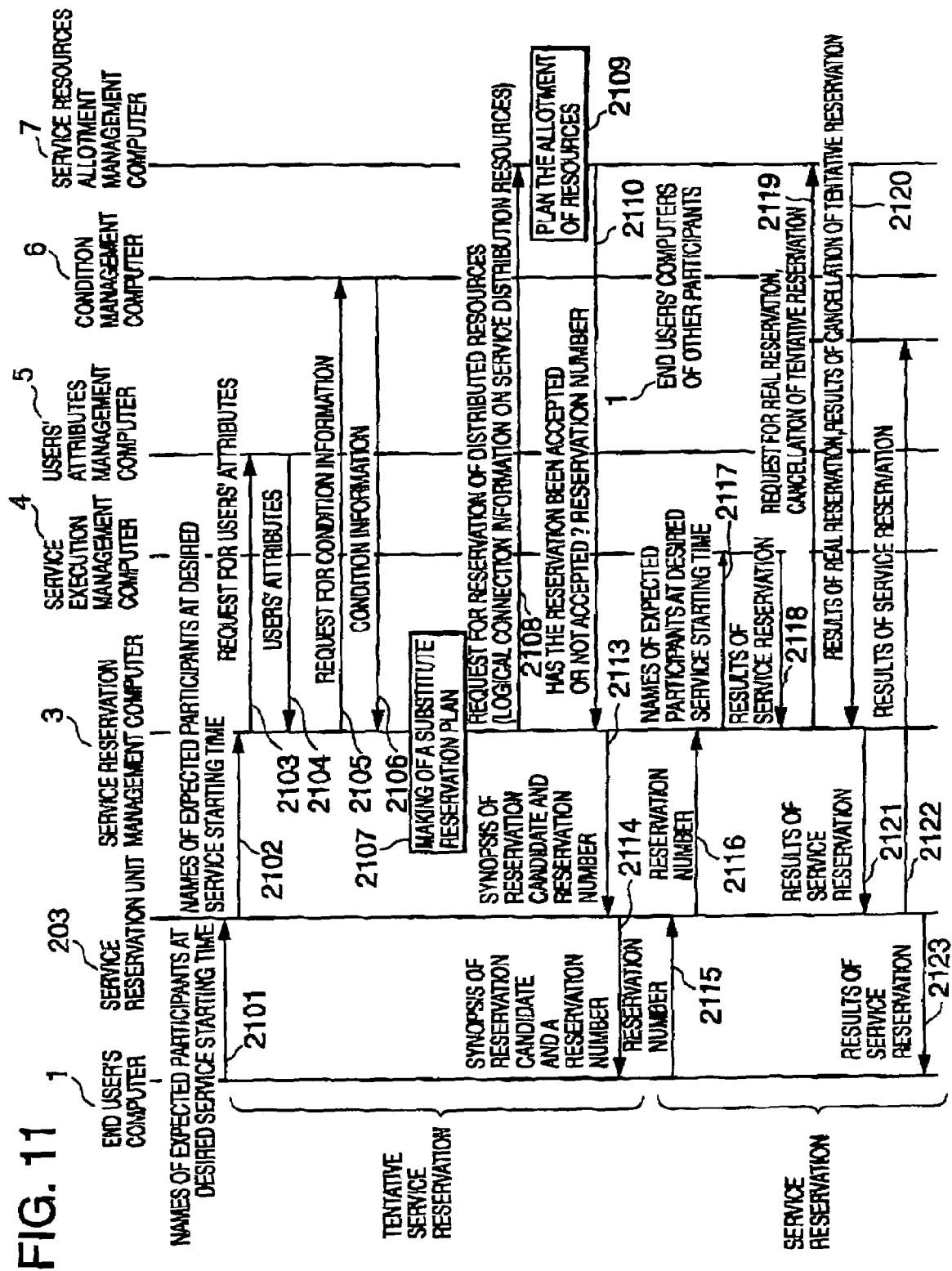
FIG. 11 is a diagram showing a processing sequence in each part in a service reservation operation of the embodiment of the present invention.

FIG. 11 shows a processing sequence of each part in the service reservation making operation.

As shown in the figure, a service reservation making operation is attained by a tentative service reservation making sequence and a service reservation making sequence.

First, the tentative service reservation making sequence will be described.

Figure 12:
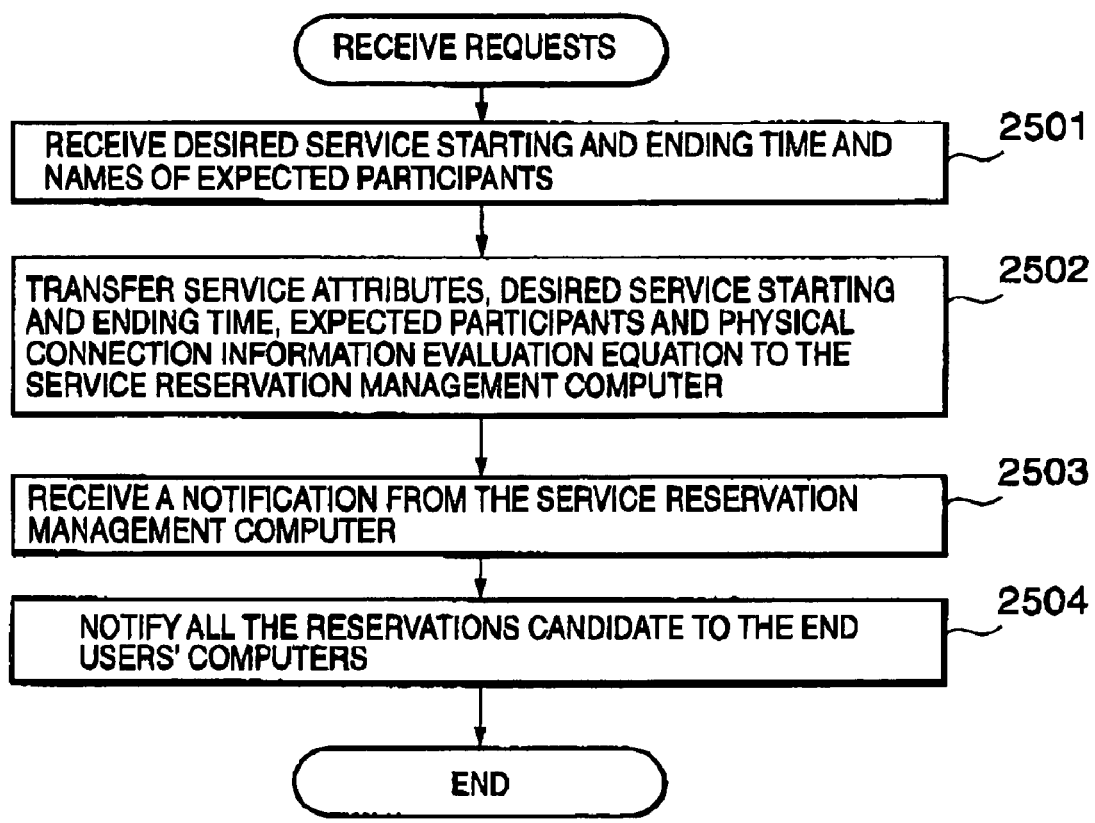
FIG. 12 is a flow chart showing a procedure of a processing operation of a service reservation unit in the tentative service reservation sequence in the embodiment of the present invention.
Figure 13:
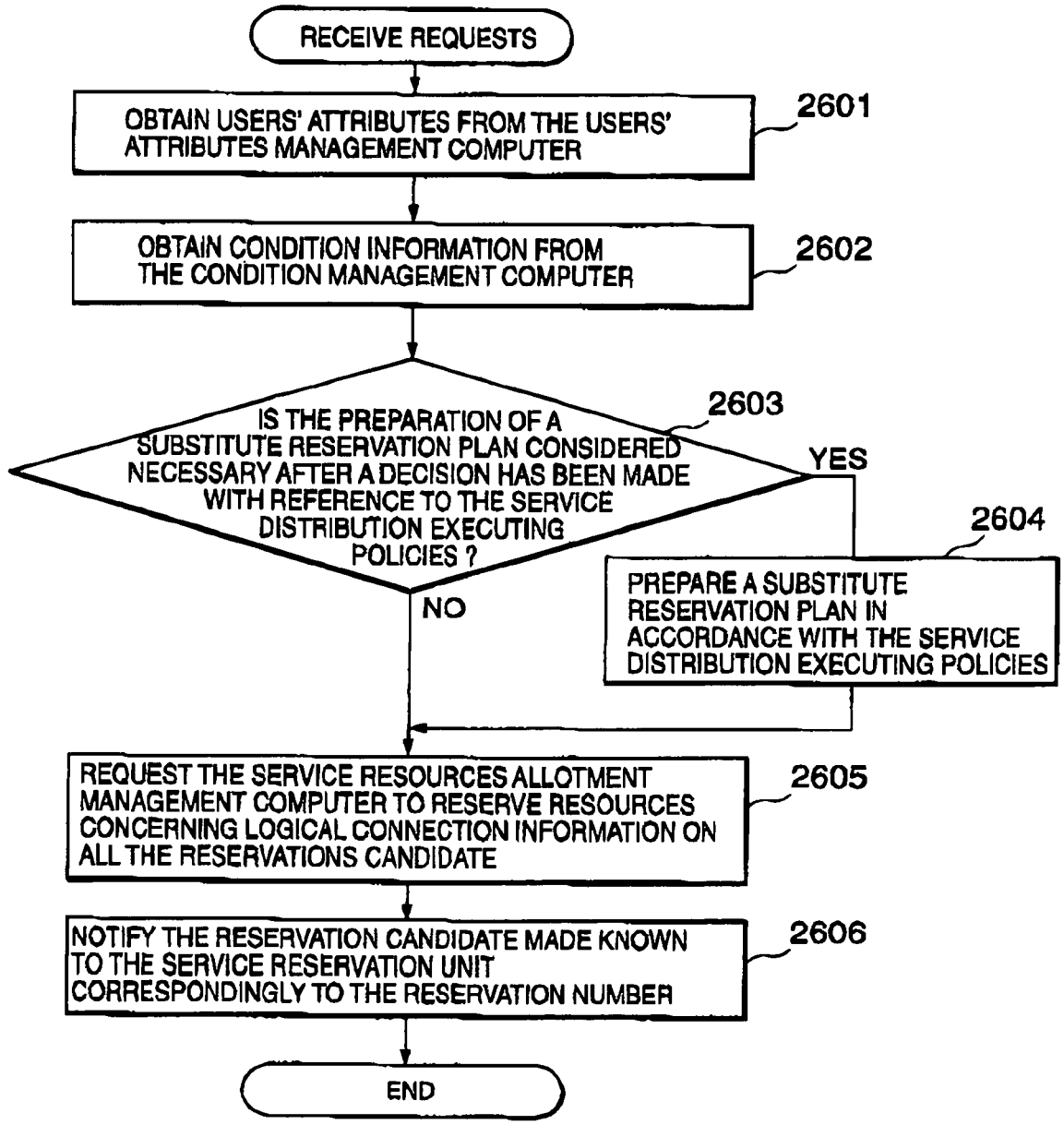
FIG. 13 is a flow chart showing a procedure of a processing operation of a service reservation management computer in the tentative service reservation sequence in the embodiment of the present invention.
Figure 14:
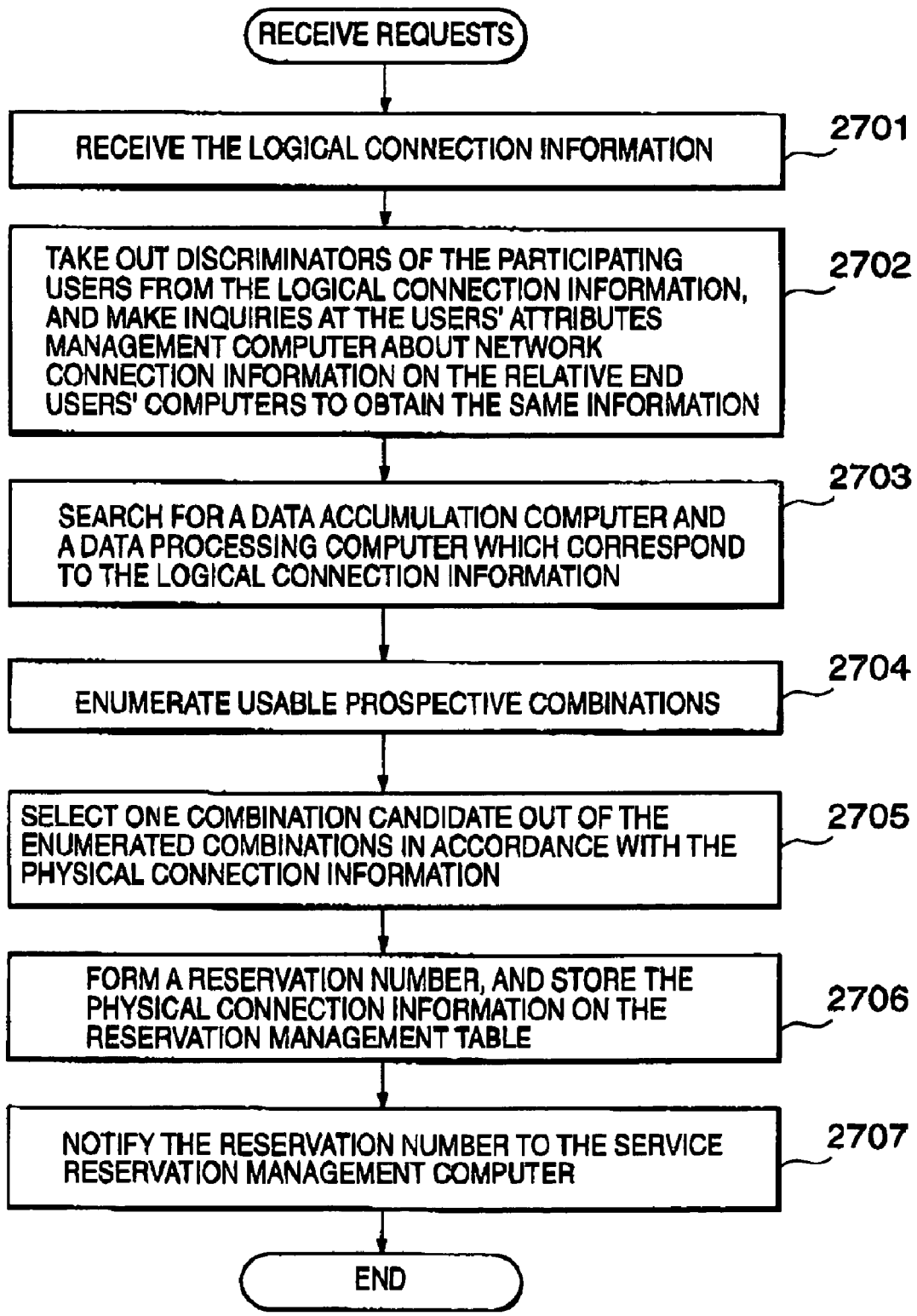
FIG. 14 is a flow chart showing the procedure of a processing operation of a service resources allotment management computer in a tentative service reservation sequence in the embodiment of the present invention.

A procedure for processing of the service reservation unit 203, a service reservation management computer 3 and the service resources allotment management computers 7 in the tentative service reservation making sequence will be shown in FIGS. 12, 13 and 14 respectively.

Referring to FIG. 11, the end user computer 1 receives desired services starting and finishing time, and discriminators of participants it the service to be reserved is a television meeting from the users via the initial screen 5301 for service reservation as shown in FIG. 10, and send them to the service reservation unit 203 (2101).

In response to this (Step 2501 of FIG. 12), the service reservation unit 203 sends this received information (2102) (Step 2502 of FIG. 12), service attributes obtained from the service type management unit 202 and registered on the service attribute information table 5101 for the service which reservation is requested, and a physical connection information evaluation equation which is determined in accordance with predetermined conditions, and which will be described later, to the service reservation management computer 3.

In response to this, the service reservation management computer 3 obtains the users' attributes (persons to participate in the meeting in a case where the desired service is to hold a television meeting) who are demanding service reservation from the users' attributes management computer 5 (2103, 2104)(Step 2601 of FIG. 13).

A logical connection in formation on the demanded service reservation is then prepared on the basis of the user's attributes obtained from the users' attributes management computer 5 and service attributes received from the service reservation units 203. The logical connection information includes the service names, the users' discriminators of all participants for the service reservation (including users who requested the making of reservation, and, in a case where the service is to hold a television meeting, persons as well who are to participate in the meeting), the logical resource information, the service starting and finishing dates and time, and the physical connection information evaluation equation.

The service reservation management computer 3 then obtain from the condition management computer 6, a load of the logical resources, which are used for the service whose logical connection information was prepared, in a period of time including the service starting and finishing time under the actual reservation condition (2105, 2106)(Step 2602 of FIG. 13).

Then the service reservation management computer 3 determines whether or not the preparation of a substitute plan is necessary in accordance with a service executing policy held in advance (Step 2603 of FIG. 13), and it determines that the preparation of the substitute plan is necessary, prepares the substitute reservation plan and its logical connection information (2107)(Step 2604 of FIG. 13).

The substitute reservation plan is prepared by altering a part of the logical resources of the high function network, which is indicated by variables of the logical connection information, i.e. service starting and finishing date and time and logical resources information, in accordance with service execution policies prepared in advance.

Examples of the service execution policies 2620-2630 are shown in FIG. 15.

The service execution policies shown in FIG. 15 are applied to a case where the logical resource information included in the logical connection Information for the reservation uses logical resources of TVconfBridge3. When the loads of the service starting and finishing date and time for the TVconfBridge3 are not lower than 95%, not lower than 80%, not lower than 50% and lower than 50% respectively, a judgement as to whether or not the reservation is accepted, and as to whether or not the substitute plan is presented, and a method of calculating the substitute plan are prescribed in accordance with the membership type of the participants.

As shown in the figure, the service execution policies are expressed by groups of if-then rules. The "if conditions" are examined in order from the upper side, and, when there are any "if conditions" whose results become real, their rules are applied, and the process described after "then" are carried out. In this case, the rules shown on the lower side of the applied rule are not applied irrespective of the results thereof.

When a person having the highest level of the membership type among the participants is a member of "individual general", and a load of the TVconfBridge3 for a desired reservation time zone is at 85%, the rule 2625 is applied. This rule indicates to search for a time zone of a load of lower than 80% in a period of time between the time four hours before the requested time zone and that four hours after the same requested time zone without denying requested reservation, and indicates that a substitute reservation plan, in which reservation service starting and finishing date and time of the requested reservation are changed to be held in the discovered time zone, should be prepared.

When a person having the highest level of the membership type among the participants is a member of "individual economy" and a load of the TvconfBridge3 for a desired reservation time zone is at 85%, the rule 2626 is applied. This rule indicates to search for a time zone of a load of lower than 80% in a period of time between the time four hours before the requested time zone and that four hours after the same requested time zone after denying requested reservation, and indicates that a substitute reservation plan, in which reservation service starting and finishing date and time of the requested reservation are changed to be held in the discovered time zone, should be prepared.

In this embodiment, the levels of the membership type become higher in the order of "individual economy", "individual general" and "corporation" ("corporation" is the highest). A request for reservation from a person having the membership type of "corporation" has a degree of importance higher than that of a request for reservation from a person having the membership type of "individual general", and a request for reservation from a person having the membership type of "individual general" has a degree of importance higher than that of a request for reservation from a person having the membership type of "individual economy".

The logical connection information on the substitute reservation plan includes user discriminators for all the persons that participate in the services by the substitute reservation plan, logical resource information representative of logical resources for the high function network 100 used in the services, service starting and finishing data and time and a physical connection information evaluation equation. In the case of the rule 2625 of FIG. 15, user discriminators of all the participants, logical resource information and a physical connection information evaluation equation become identical with those of the logical connection information on the requested reservation.

The requested reservation and the substitute reservation plan prepared on the basis of the results of the execution of the above-described processes will hereinafter be called reservation candidate. When the substitute reservation plan is not prepared, the requested reservation only becomes the candidate reservation.

When the reservation candidate has thus been determined, the service reservation management computer 3 transmits a request for allotment of the service resources with respect to all the preservation candidate to the service resources allotment management computer 7 (2108)(Step 2606 of FIG. 13). During this time, logical connection information on the service resources to be used is designated.

When the service resources allotment management computer 7 receives this request (Step 2701 of FIG. 14), the computer 7 makes a service resources allotment plan (2109).

According to the service resources allotment plan, physical resources for the network units 12, data accumulation computers 11 and data processing computers 13, which are necessary to execute the services shown by the logical connection information, are allotted to each reservation candidate.

First, the service resources allotment management computer 7 inquire from the users' attributes management computer 5 about the network connection information corresponding to the users' discriminators of all the participants indicated by the logical connection information registered on the users' attributes table 5001 to obtain the network connection information, said information is obtained (Step 2702 of FIG. 14).

Then the service resources allotment management computer 7 selects all groups of physical resources corresponding to the logical resources indicated by the logical resources information of the logical connection information are selected by using a data accumulation resources management table 2650 and a data processing resources management table 2660 which are held in advance, and the network connection information corresponding to the users' discriminators of all the participants indicated by the previously obtained logical connection information (Step 2703 of FIG. 14).

FIG. 16 shows an example of the data accumulation resources management table 2650. This data accumulation resources management table 2650 is provided on the assumption that the data accumulation computers 11 are used as video cash servers. Concerning every physical resource, logical resource 5402 to which the physical resource belongs, a physical resource discriminator 5403, a computer discriminator 5404 of the data accumulation computers 11 in which the physical resource is provided, and a total amount of the physical resource is registered on the table 2650. In this example, a combination of the number of acceptable reservation 5405, a maximum transfer speed 5406 and a maximum number of clients (number of the end users' computers 1 to which video data can be transmitted at once) 5407 are registered as a total amount of the physical resource.

FIG. 17 shows an example of the data processing resources management table 2660. This data processing resources table 2660 is provided on the assumption that the data processing computers 13 are used as apparatuses for subjecting television meeting bridge or processing a superimposition on image data. Concerning every physical resource, logical resource 5502 to which the physical resource belongs, a physical resources discriminator 5503, a computer discriminator 5504 for the data processing computers 13 in which the physical resource is provided, and a total amount of the physical resources are registered on the table 2660. In this example, a combination of the number of acceptable reservation 5505, a maximum transfer speed 5506 and a maximum number of connection (number of end users' computers 1 capable of participating a television meeting at once) 5507 is registered as a total amount of the physical resources.

Each of the physical resources groups selected forms a group of one of the physical resources corresponding to the logical resources indicated by the logical resources information of the logical connection information registered on the data accumulation resources management table 2650 and data processing resources management table 2660, and physical resources (i.e. transmission and exchange network or a combination thereof) for the network units 12 capable of forming one path, between the end users' computers 1 indicated by the one of the physical resources and the network connection information by transmission capacity and transmission quality indicated by the logical connection information.

After a group of physical resources has thus been selected, physical connection information candidate is selected by using a reservation management table 35 shown in FIG. 18 (Step 2704 of FIG. 14).

The reservation management table 35 is formed for each reservation set or temporarily set, so as to include a reservation number 5602, reservation type 5603, physical connection information 5604 and starting and finishing date and time 5605, 5606. In the reservation type 5603 in this example, either "real reservation" indicative of properly set reservation or "tentative reservation" indicative of tentatively set reservation is set. The physical connection information 5604 indicates physical resources used for reserved service and a using amount of the resources used for the service. The starting and finishing date and time 5605, 5606 represent the time at which the reserved service is executed.

Namely, in a Step 2704 of FIG. 14, the following operation is carried out. As to the service for reservation candidate being processed, assumed that the service for the reservation registered as "real reservation" on the reservation management table 35 is executed in accordance with the starting and finishing date and time, set with respect to the reservation, during the time between the service starting and finishing time designated in the logical connection information by using a group of physical resources and a using resource amount indicated by the physical connection information set with respect to the mentioned reservation. In that case, all groups of physical resources in which the sum of resources required to execute each physical resource belonging to the group of the physical resources do not exceed the total amount of the physical resources when the group of the physical resources is executed by using the amount of resources written in the logical resources information in the logical connection information, are extracted. Each extracted group of physical resources is determined as physical connection information candidate in which the amount of resources written in the logical resources information is set as a using resource amount. With respect to this physical connection information candidate, the service starting and finishing data and time indicated by the logical connection information is set as starting and finishing date and time. A total amount of the physical resources for the transmission and exchange network is set as a total transmission capacity of the transmission and exchange network.

When no physical connection information candidate could be prepared in this process, the service resources allotment management computer 7 informs a failure in the allotment of resources to the service reservation management computer 3 (2110). When physical connection information candidate could be prepared, the service resources allotment management computer 7 evaluates each physical connection information candidate in accordance with the physical connection information evaluation equation indicated by the logical connection information, and selects the highest-evaluated physical connection information candidate as physical connection information (Step 2705 of FIG. 14). The physical connection information evaluation equation is, for example, an equation for increasing the evaluation value of the physical connection information in inverse portion to the cost of use.

Then the service resources allotment management computer 7 generates a reservation number to register (Step 2706 of FIG. 14) on a reservation management table 35 shown in FIG. 18 with the physical connection information selected in Step 2705 shown in FIG. 14 and the starting and finishing date and time set with respect thereto. During this time, the reservation type is set to "tentative reservation".

Then the service resources allotment management computer 7 informs the stored reservation number to the service reservation management computer 3 (Step 2707 of FIG. 14). As a result, the reservation numbers registered with respect to respective reservation candidates are notified to the service reservation management computer 3.

After the service reservation management computer 3 receives reservation numbers with respect to the respective reservation candidate from the service resources allotment management computers 7, the computer 3 stores the reservation numbers and logical connection information on reservation candidate, and notifies the service reservation units 203 of this fact (2113)(Step 2606 of FIG. 13).

Consequently, the service reservation units 203 informs the reservation numbers and the logical connection information to the end users' computers 1 (2114)(Step 2503 of FIG. 12).

The end users' computers 1 then display the received reservation numbers and logical connection information as a synopsis of reservation candidate.

The tentative service reservation making sequence have been described.

The real service reservation making sequence will now be described.

Figure 19:
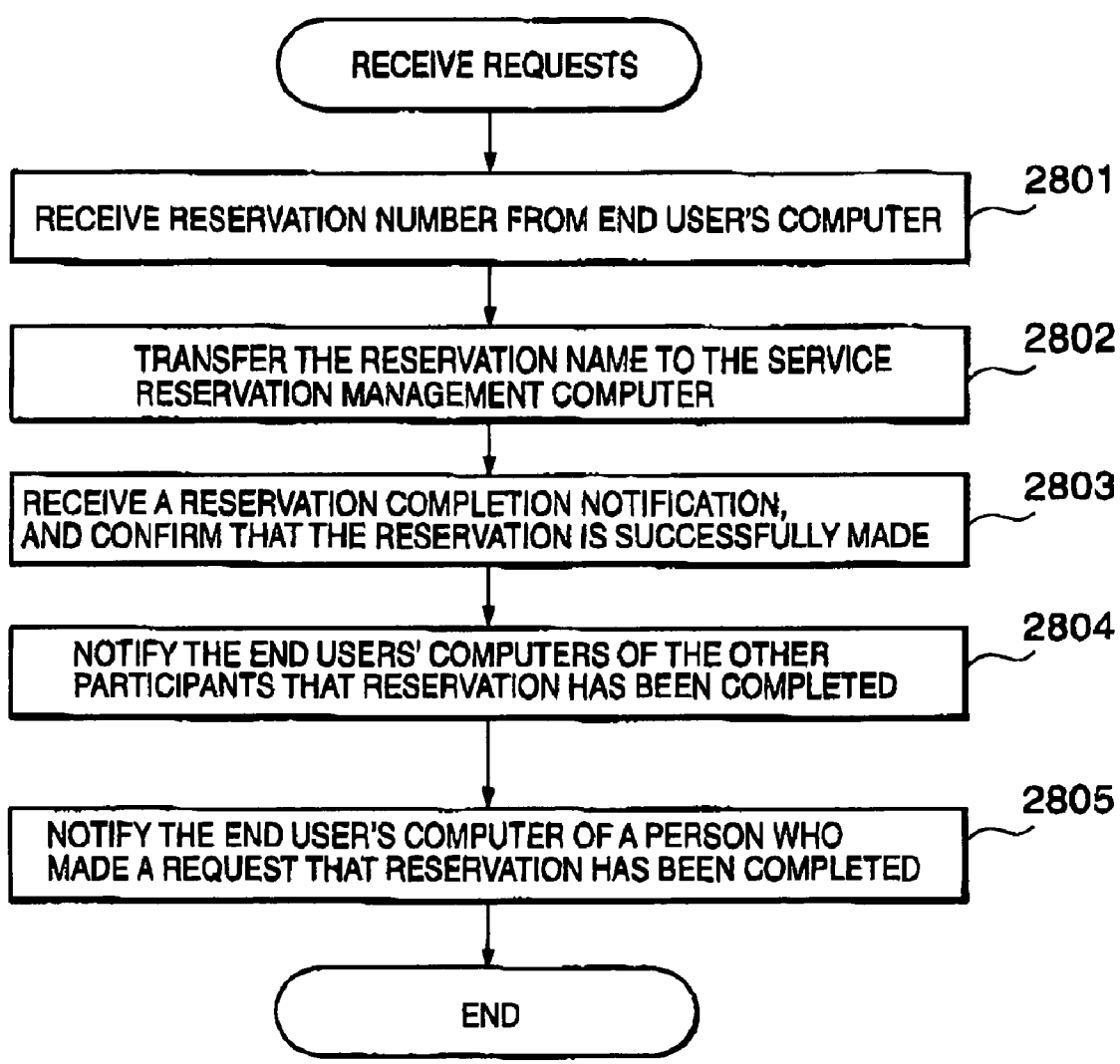
FIG. 19 is a flow chart showing a procedure of a processing operation of a service reservation unit in a tentative service reservation sequence in the embodiment of the present invention.
Figure 20:
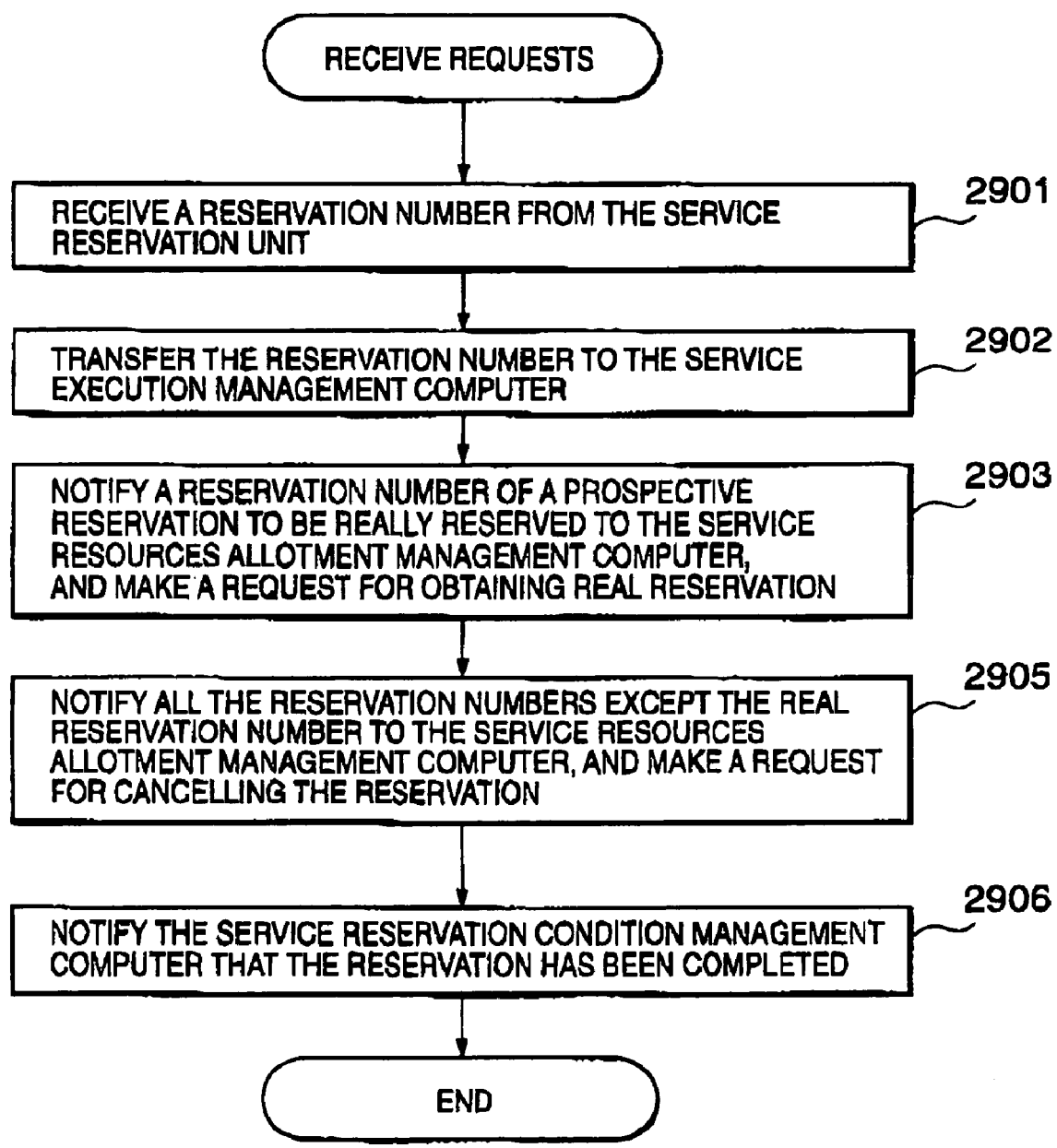
FIG. 20 is a flow chart showing a procedure of a processing operation of a service reservation management computer in a service reservation sequence in the embodiment of the present invention.
Figure 21:
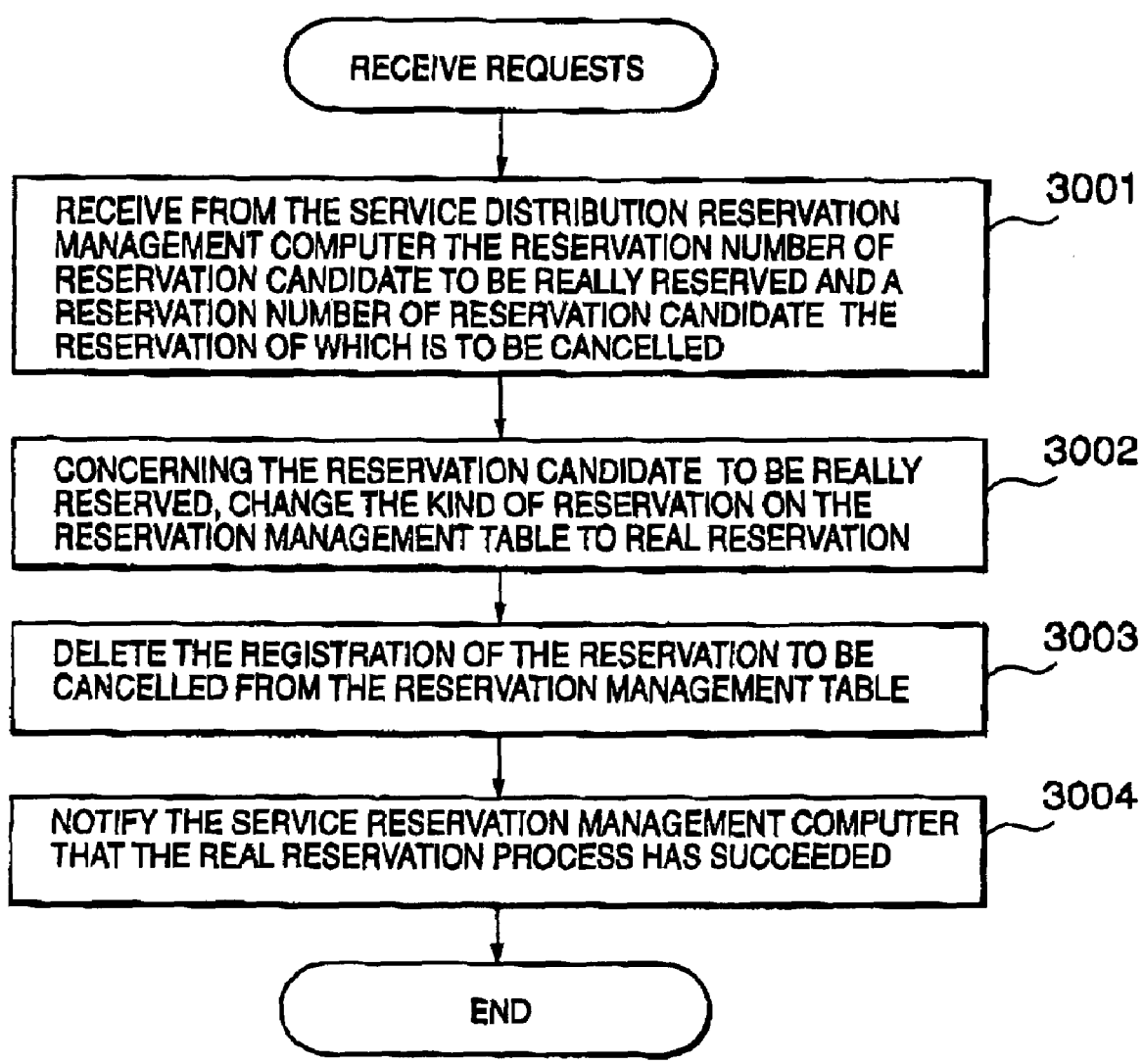
FIG. 21 is a flow chart showing a procedure of a processing operation of the service resources allotment management computer in the service reservation sequence in the embodiment of the present invention.

A procedure for processing operations of service reservation units 203, service reservation management computers 3 and service resources allotment management computers 7 in the service reservation making sequence are shown in FIGS. 19, 20 and 21.

Referring to FIG. 11, the end user's computer 1 transmits the reservation number designated by the user out of the synopsis of reservation candidate obtained from the service reservation units 203 to the service reservation unit 203 to demand the making of real reservation therefrom (2115).

Consequently, the service reservation unit 203 transfers the received reservation number to the service reservation management computer 3 (2116)(Steps 2801 and 2802 of FIG. 19). The service reservation management computer 3 transfers the reservation number, whose real reservation was demanded, and the logical connection information stored in Step 2606 of FIG. 13 corresponding to the reservation number to the service execution management computer 4 (2117)(Steps 2901 and 2902 of FIG. 20). The service execution management computer 4 stores the reservation number and the mentioned information and provides the results of the service reservation to the service reservation management computer 3 (2118)(Steps 2901 and 2902 of FIG. 20).

Then the service reservation management computer 3 transfers the reservation number, whose real reservation was demanded, to the service resources allotment management computer 7, to demand the real reservation thereof (Step 2903 of FIG. 20) and notify all reservation numbers stored in Step 2606 of FIG. 13 except for the reservation number whose real reservation was demanded to the service resources allotment managing computer 7, to request for the cancellation of the reservation (2119 and 2120) (Steps 2905 and 2906 of FIG. 20).

Consequently, the service resources allotment management computer 7 changes the reservation type having the reservation number whose real reservation was demanded to "real reservation" in the reservation management table 35 (Steps 3001 and 3002 of FIG. 21), and deletes from the reservation management table 34 the reservation (their reservation type is "tentative reservation" at this time) of reservation numbers whose cancellation was demanded (Step 3003 of FIG. 21).

The success in making real reservation is notified to the service reservation management computer 3 (2120) (Step 3004 of FIG. 21).

Consequently, the service reservation management computer 3 notifies the service reservation units 203 that making real reservation has finished (2121) (Step 2803 of FIG. 19), and sends (Step 2505 of FIG. 21) to the condition management computer 6 the reservation number and the logical connection information stored in Step 2606 shown in FIG. 13 corresponding to the reservation number of which the making of real reservation succeeded. The condition management computer 6 adds the reservation represented by the received logical connection information to the present reservation condition managed thereby. The condition management computer 6 calculates for every service on the basis of this reservation condition and a total amount of each logical resources for each service held in advance, the load of logical, resources, at each point in time, for the high function network 100 in the present reservation condition, i.e., in a case where the service is executed in accordance with the reservation.

When the service indicated by the logical connection information corresponding to the reservation number of which the making of real reservation was succeeded is a telephone meeting etc., the service reservation units 203 informs the completion of the making of real reservation, with logical connection information to each participant other than the users who demanded the making of real reservation in the service (2122). This enables each participant to ascertain that the service in which he or she is to participate was reserved (Step 2804 of FIG. 19). The completion of the reservation is notified to the end user's computer 1 of the user who demanded the real reservation (2123)(Step 2805 of FIG. 19).

The real service reservation making sequence has been described above.

The service execution control operation will now be described.

Figure 22:
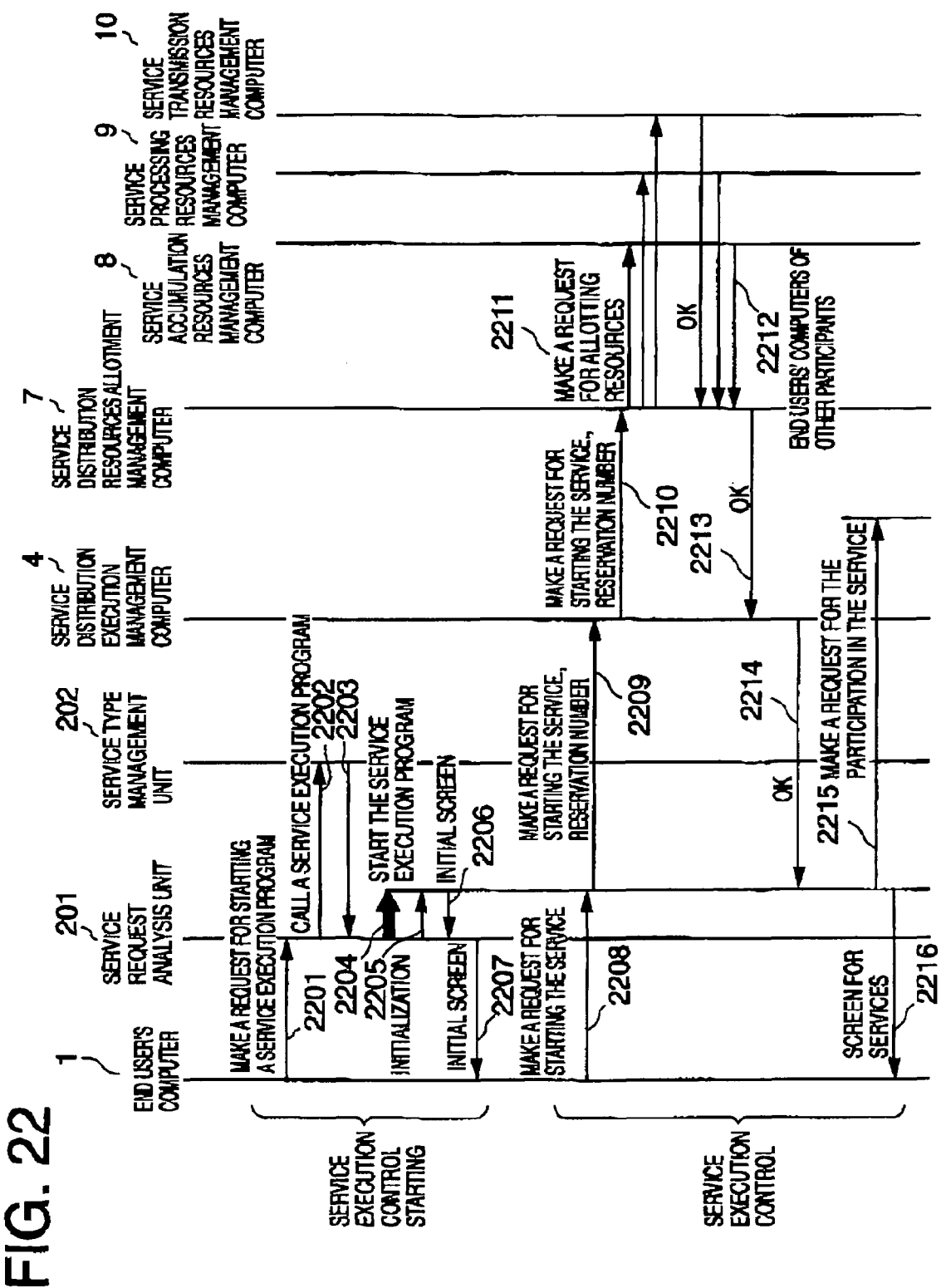
FIG. 22 is a diagram showing a processing sequence of each part in a service execution control operation in the embodiment of the present invention.

FIG. 22 shows a processing sequence of each part in a service execution control operation.

As shown in the figure, the service execution control operation is attained by a service execution control starting sequence and a service execution control sequence.

First, the service execution control starting sequence will be described.

Figure 23:
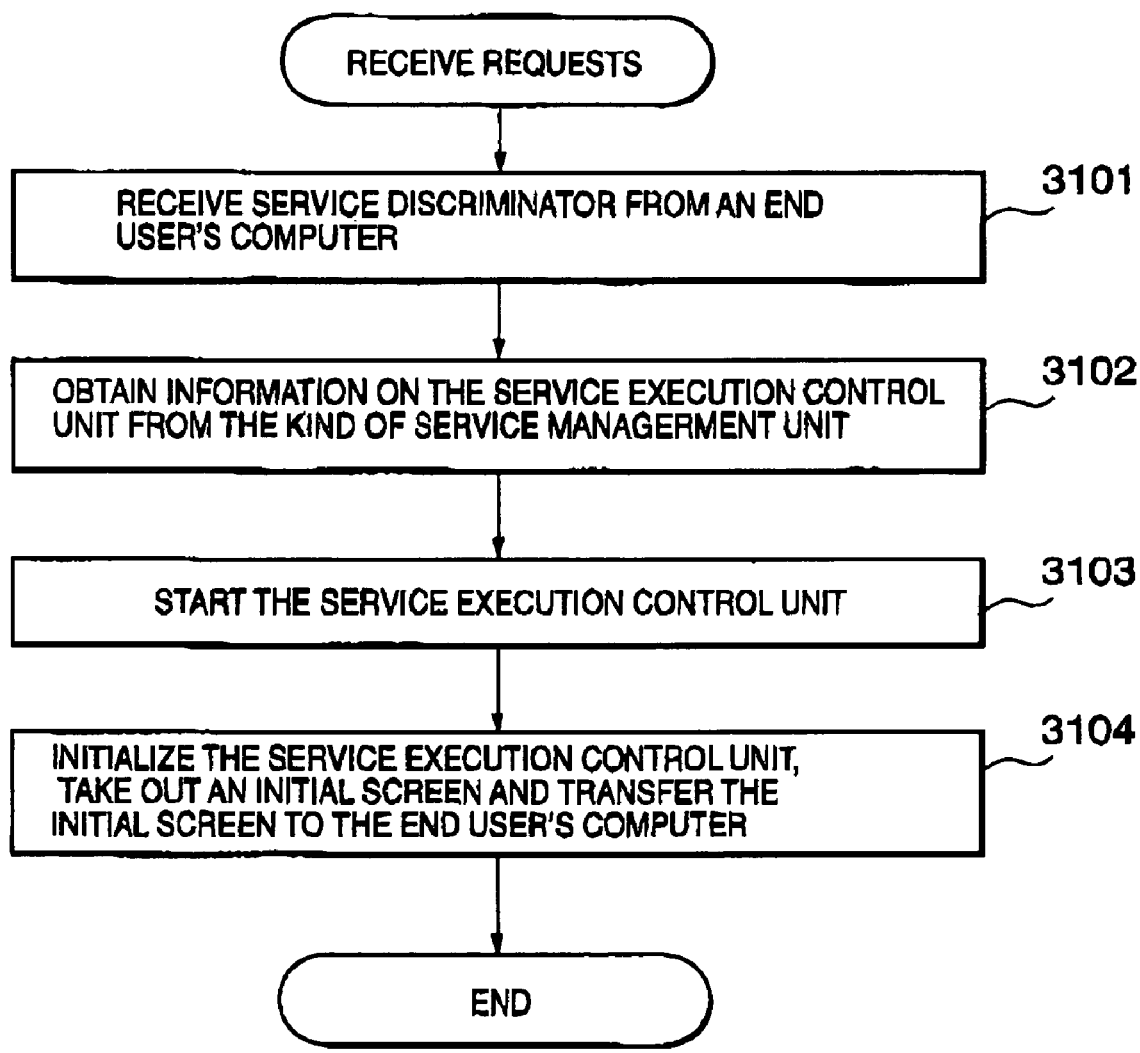
FIG. 23 is a flow chart showing a procedure of a processing operation of the request for service analysis unit in a service execution control starting sequence in the embodiment of the present invention.

FIG. 23 shows a procedure for a processing operation of the service request analysis unit 201 in the service execution control starting sequence.

Referring to FIG. 22, the end user's computer 1 designates a service discriminator representing the service whose execution is requested, the service request analysis unit 201, and request for storing the service execution control operation (2201).

When the service request analysis unit 201 receives this request (Step 3101 of FIG. 23), it obtains information on the service execution control unit 2 corresponding to the service designated by the service discriminator from the service type management unit 202 (2202, 2203) (Step 3102 of FIG. 23), to start the service execution control unit 2 concerned (2204) (Step 3103 of FIG. 23). The started service execution control unit 2 forms an initial screen for the service execution control operation (2205), and delivers this to the service request analysis unit 201 (2206). The service request analysis unit 201 transfers the initial screen to the end user's computer 1 (2207) (Step 3104 of FIG. 23). The end user's computer 1 displays the received initial screen.

The service execution control starting sequence has been described above.

The service execution control sequence will now be described.

Figure 24:
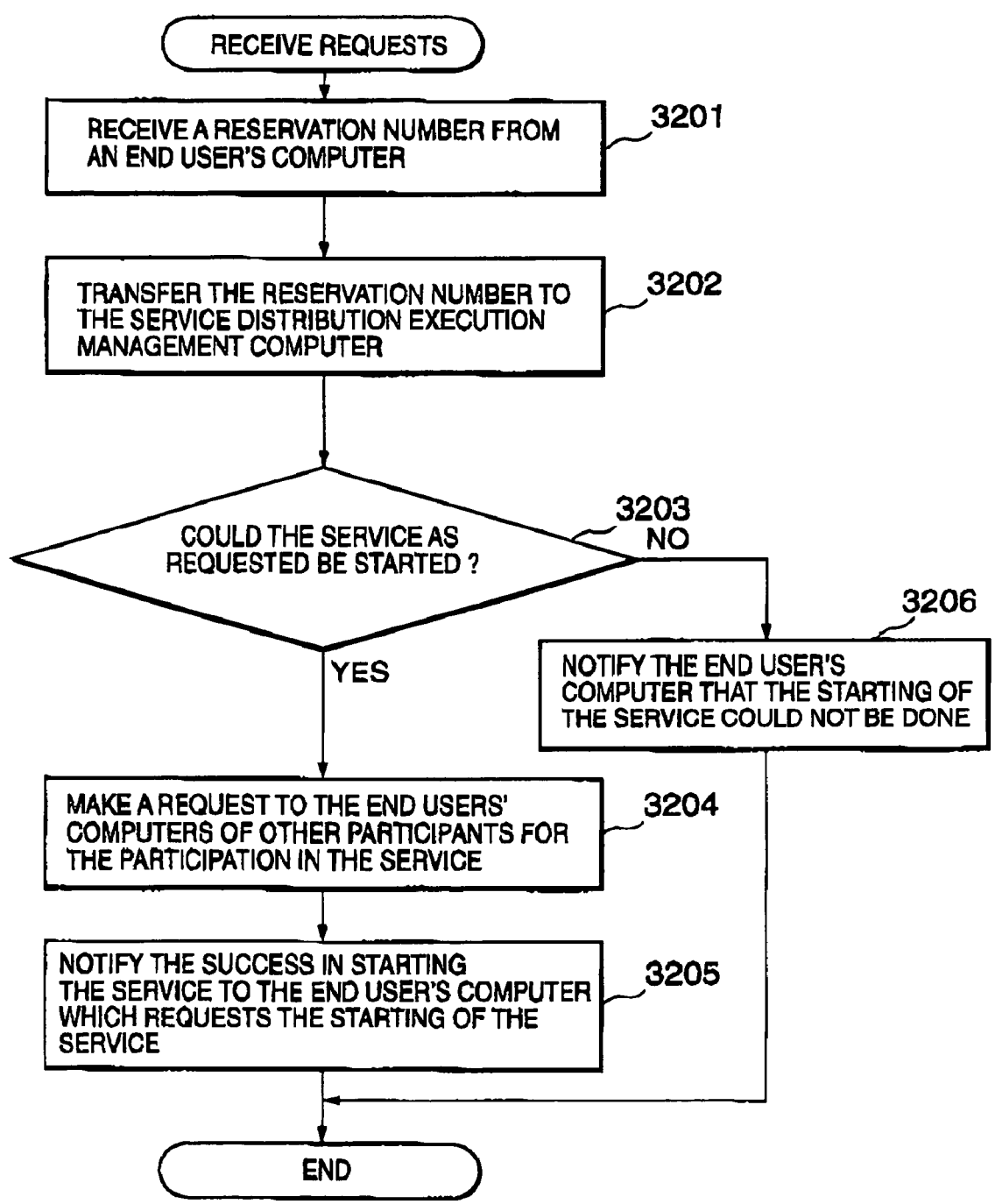
FIG. 24 is a flow chart showing a procedure of a processing operation of a service execution control unit in a service execution control sequence in the embodiment of the present invention.

A procedure for a processing operation of the service execution controller 2, service execution management computer 4 and service resources allotment management computer 7 in the service execution control sequence is shown in FIGS. 24, 25 and 26.

Referring to FIG. 22, the end user's computer 1 transmits the reservation number whose making of real reservation has already finished to the service execution control unit 204 to request for starting the service reserved in the reservation (2208).

When the service execution control unit 204 receives this request (Step 3201 of FIG. 24), it refers to the logical connection information and the groups of the reservation number held in itself, and notifies the denial of the request to the end user's computer 1 when there is not logical connection information corresponding to the reservation number concerning the request, or when there is not the present time between the service starting time and service finishing time which are indicated by the logical connection information corresponding to the reservation number concerning the request. When there is the present time between the service starting tlme and service finishing time which are indicated by the logical connection information corresponding to the reservation number concerning the request, this request is transferred to the service execution management computer 4 (2209)(Step 3202 of FIG. 24).

The service execution management computer 4 receives this request (Step 3301 of FIG. 26), and transfers it to the service resources allotment management computer 7 (2210) (Step 3302 of FIG. 25).

When the service execution allotment management computer 7 receives (Step 3401 of FIG. 25), it takes out (Step 3402 of FIG. 26) the physical connection information on the reservation corresponding to the reservation number concerning the request from the reservation management table 35. Next, as to each of the physical resources included in the physical connection information, the service execution allotment management computer 7 requests for allotment of resources of using resource amount indicated by the physical connection information of the physical resources to the data accumulation resources management computer 8, the data transmission resources management computer 9 and the data processing resources management computer 10 which manage the physical resource (2211)(Step 3403 of FIG. 26).

The data accumulation resources management computer 8, the data transmission resources management computer 9 and the data processing resources management computer 10 notify allotment success to the service resources allotment management computer 7 when there is room whose volume corresponds to the using resource amount requested, among the physical resource which is requested for the allotment (2212).

When the service resources allotment management computer 7 to confirm that the allotment of all service resources succeeded by this notification, the computer 7 notifies the allotment success and the physical connection information on the reservation number concerning the request to the service execution management computer 4 (2213)(Step 3404 of FIG. 26).

Owing to this notification, the service execution management computer 4 confirms that the allotment succeeded (Step 3303 of FIG. 25), and notifies the received physical connection information and the success of the request to the service execution control member 204 (2214)(Step 3304 of FIG. 25).

Owing to this notification, the service execution management computer 4 judges whether or not the request was succeeded (Step 3203 of FIG. 24). When the request was succeeded, and the requested service is a television meeting, the designation of the service and a request for the participation in the service are notified with the received physical connection information to the end users' computers 1 of all the participants in the service except the user who requested for the service (2215) (Step 3204 of FIG. 24). When the request was not succeeded, the end user's computer 1 is notified that the starting of the service could not be done (Step 3306 of FIG. 24).

The success in the starting of the service is notified with the received physical connection information to the end user's computer 1 which requested for the service (2216) (Step 3205 of FIG. 24).

The end user's computer 1 to which the success in the starting of the service was notified utilizes the service using the high function network 100, by using the physical resources indicated by the physical connection information received with the notification. The end users computer 1 to which the request for participating in the service was notified participates in the service designated with the notification from the high function network 100, by using the physical resources indicated by the physical connection information received with the notification.

The above is a description of an embodiment of the present invention.

As described above, in the this embodiment, a request for service having a degree of importance not higher than a level of importance which increases in proportion to a load of resources is denied even when reservation is accepted to execute the service in accordance with the reservation, and the amount of resources used for the service does not exceed a level utilizable for the service by a process using the service operating policies of FIG. 15. When a request for reservation is thus denied, or, even when such a request is not denied, a substitute reservation plan capable of heightening the resources utilization efficiency is prepared, and presented to the users to accelerate the users' utilization of services based on the substitute reservation plan.

Therefore, reservation of a high degree of importance can be accepted preferentially with a high probability. In addition, reservation of a low degree of importance once accepted is not cancelled later. Furthermore, when the utilization of the services based on a substitute reservation plan in which a part only of the contents of a user's desired reservation is changed, i.e., the contents of a user's desired reservation are respected to a predetermined extent is recommended to the users, whereby the users' reservation can be induced in the direction in which the utilization efficiency of resources increases.

Therefore, in the this embodiment, the utilization efficiency of resources and the degree of the users' satisfaction concerning the utilization of services can be optimized.

In this embodiment, as a substitute reservation plan, a case where the service starting and finishing time out of variables constituting the contents of reservation requested by a user is changed by using the service operating policies shown in FIG. 15 is described. However, it may be determined arbitrarily in accordance with the environment and condition of the service supply system and the operator's policy what kind of variable among the variables constituting the contents of reservation should be changed to prepare a substitute reservation plan to be presented. The variables out of variables constituting the contents of the reservation requested by a user that can be changed to present a substitute reservation plan include, for example, variables concerning the time, variables concerning quality and variables concerning accounting. The examples of the variables concerning the time include the service starting and finishing time shown in this embodiment. The examples of the variables concerning quality include a band and a delay of a communication line, the existence or non-existence of a redundant structure, an error rate of symbols, existence or non-existence of service assurance and the capacity of processing the service producing resources. The examples of variables concerning accounting include the utilization charge for the resources used. For example, when the reservation requested by a user is service using band assurance-carrying data transfer resources with a load thereof large, the reservation using non-band-assurance-carrying data transfer resources instead of the band assurance-carrying data transfer resources can be set as a substitute reservation plan. When a user selects this substitute reservation plan in this case, an internet is allotted, whereas, when the service as in the initially requested reservation is executed, a non-synchronous transmission mode net is allotted thereto.

Although the resources are managed in two stages, i.e., in stages of logical resources and physical resources in this embodiment, the managing of the resources may also be done in one stage only. In both of these cases, the unit of the resources to be managed may be an arbitrary unit related to the service.

The techniques in this embodiment for denying reservation in accordance with the load of resources and the degree of importance of the reservation, and presenting a substitute plan can be applied in the same manner to an arbitrary system for supplying service by using certain resources besides the high function network shown in this embodiment.

According to the present invention described above, the rate of utilization of resources and the degree of users' satisfaction concerning the utilization of services can be optimized. To be exact, for example, the services which do not cause the degree of users' satisfaction concerning the utilization thereof to lower greatly with a considerably high efficiency of utilization of resources maintained can be supplied. Also, the smoothing of the users' utilization of the services can be done as services with which the users are satisfied to a certain extent are supplied.

What is claimed is:

1. A service reservation system adapted to accept from users, connected to a network requests for reservations for utilizing services supplied by using resources, comprising:
    a reservation condition management element adapted to manage the accepted reservation of services as reservation conditions, thereby controlling the resources which supply the services;
    a first acceptance element adapted to accept service booking requests from users;
    an importance degree determining element adapted to determine, in accordance with attributes of the users, status information of the services including load level and social factors and attributes of the services, a degree of importance of the service booking requests accepted by the first acceptance element,
    wherein said attributes of the users include for each user information of a position on the network to which the user is connected and an identifier of the services to which the user has subscribed,
    wherein said attributes of the services include for each service an attribute of a logic resource used by the service and an identifier and attribute of a replacement logic resource to be used in place of the logic resource as needed;
    a reservation taking element adapted, when a load level, which is determined depending upon the reservation condition managed by the reservation condition management element, of resources used for supplying object services relative to the service booking requests accepted by the first acceptance element is higher than a predetermined level, to deny the acceptance of service booking requests if the degree of importance of the service booking requests determined by the importance degree determining element is lower than a predetermined importance degree determined by a predetermined standard, and to permit the acceptance of the service booking requests if the degree of importance of the service booking requests determined by the importance degree determining element is not lower than the predetermined importance degree,
    wherein a service resource allotting element adapted to select a combination among combinations of resources which includes data accumulation resources, data transmission resources and data processing resources to allot resources which constitute the combination thus selected to the reservation of the service whose reservation was taken,
    wherein said data transmission resources are adapted to supply transmission and exchange service to the users,
    wherein said data processing resources are adapted to supply the users with information processing service via the transmission and exchange service,
    wherein said data accumulation resources are adapted to supply the users with information accumulating service via the transmission and exchange service;
    means for deciding a logical resource corresponding to a service type that includes a service booking request based on service attribute information that holds a correspondence relationship between the service type and the logical resource; and
    means for deciding allocation of a physical resource fulfilling the decided logical resource based on resource management information that holds a correspondence relationship between the logical resource, the physical resource and an attribute of the physical resource,
    wherein the logical resource specifies an attribute of the physical resource necessary for implementing a service specified by the service type.

2. A service reservation system according to claim 1, wherein said predetermined standard is a standard at which the predetermined importance degree increases in proportion to the load level of resources in a period of time of execution of object service relative to the reservation booking request.

3. A service reservation system according to claim 1, further comprising:
    a substitute reservation plan preparing element adapted to prepare, when the acceptance of the reservation in the reservation booking request is denied by the reservation taking element, altering at least one condition-variable among condition-variables of a resource search condition equation which constitutes the content of reservation in the reservation booking requests accepted by the first acceptance element, in such a manner that a general resource utilization efficiency increases in accordance with the contents of the reservation and a load level of resources used for supplying of the object services relative to the reservation booking request, said load level being determined by the reservation condition managed by the reservation condition management element;
    a substitute reservation plan presentation element adapted to present said at least one substitute reservation plan which is prepared by the substitute reservation plan preparation element, to the users; and
    a second acceptance element adapted to accept the user's selection of the substitute reservation plan,
    wherein said reservation taking element accepts as reservation the substitute reservation plan whose selection is accepted by the second selection accepting element.

4. A service reservation system according to claim 1, further comprising:
    a substitute reservation preparation element adapted to prepare, when the acceptance of the reservation in the reservation booking request is allowed by the reservation taking element, altering at least one condition-variable among condition-variables of a resource search condition equation which constitutes the content of reservation in the reservation booking requests accepted by the first acceptance element, in such a manner that a general resource utilization efficiency increases in accordance with the contents of the reservation and a load level of resources used for the supplying of the object services relative to the reservation booking request, said load level being determined by the reservation condition management element;

a substitute reservation plan presentation element adapted to present said at least one substitute reservation plan which is prepared by the substitute reservation plan preparation element, to the users; and a second acceptance element adapted to accept the user's selection of the substitute reservation plan or the reservation allowed by the reservation taking element; wherein said reservation taking element accepts the substitute reservation plan and reservation when its selection is accepted by the second acceptance element; and said reservation taking element accepts when its selection is accepted by the second acceptance element.

5. A service supplying system adapted to supply services by using resources, comprising the service reservation system defined in claim 1, wherein said resources supplying services in accordance with the reservation accepted by the service reservation system.

6. A service reservation system adapted to accept form users requests, connected to a network for reservations for utilizing services supplied by using resources, comprising:

a reservation condition management element adapted to manage accepted reservations of services as reservation condition, thereby controlling the resources which supply the services;

a first acceptance element adapted to accept service booking requests from users in accordance with a degree of importance of the service booking requests, said degree of importance being determined based on attributes of the users, status information of the services including load level and social factors and attributes of the services, wherein said attributes of the users include for each user information of a position on the network to which the user is connected and an identifier of the services to which the user has subscribed, wherein said attributes of the services include for each service an attribute of a logic resource used by the service and an identifier and attribute of a replacement logic resource to be used in place of the logic resource as needed;

a substitute reservation plan preparation element adapted to prepare at least one substitute reservation plan which is obtained by altering at least one condition-variable among condition-variables of a resource search condition equation which constitutes the content of reservation in the reservation booking requests accepted by the first acceptance element, in such a manner that a general resources utilization efficiency increases in accordance with the contents of the reservation and a load level of resources used for supplying of the object services relative to the reservation booking requests, said load level being determined by the reservation condition managed by the reservation condition management element;

a substitute reservation plan presentation element adapted to present said at least one substitute reservation plan which is prepared by the substitute reservation plan preparation element, to the users;

a second acceptance element adapted to accept the user's selection of said at least one substitute reservation plan;

a reservation element adapted to accept as reservation the substitute reservation plan whose selection is accepted by the second acceptance element, wherein said resources include a transmission and exchange network adapted to supply transmission and exchange service to the users, and a data processing unit adapted to supply the users with information processing and accumulating services via said transmission and exchange network;

means for deciding a logical resource corresponding to a service type that includes a service booking request based on service attribute information that holds a correspondence relationship between the service type and the logical resource; and means for deciding allocation of a physical resource fulfilling the decided logical resource based on resource management information that holds a correspondence relationship between the logical resource, the physical resource and an attribute of the physical resource, wherein the logical resource specifies an attribute of the physical resource necessary for implementing a service specified by the service type.

7. A service reservation taking method for receiving from users, connected to a network the reservation for utilizing services supplied by using resources, comprising:

a first step of accepting service reservation booking requests from the users;

a second step of determining a degree of importance of the accepted service booking requests in accordance with attributes of the users, status information of the services including load level and social factors and attributes of the service, wherein said attributes of the users include for each user information of a position on the network to which the user is connected and an identifier of the services to which the user has subscribed, wherein said attributes of the services include for each service an attribute of a logic resource used by the service and an identifier and attribute of a replacement logic resource to be used in place of the logic resource as needed;

a third step of when a load level, which is determined depending upon the reservation condition, of resources used for supplying object services relative to the service booking requests is higher than a predetermined level, denying the acceptance of the service booking requests if the degree of importance of the service booking requests is lower than a predetermined importance degree determined by a predetermined standard, and permitting the acceptance of the service booking requests if the degree of importance of the service booking requests is not lower than the predetermined importance degree;

a fourth step of allotting an element adapted to select a combination among combinations of the resources which includes data accumulation resources, data transmission resources and data processing resources to allot resources which constitute the combination thus selected to the reservation of the service whose reservation was taken, wherein said data transmission resources are adapted to supply transmission and exchange service to the users, wherein said data processing resources are adapted to supply the users with information processing service via the transmission and exchange service, and wherein said data accumulation resources are adapted to supply the users with information accumulating service via the transmission and exchange service;

a fifth step of deciding a logical resource corresponding to a service type that includes a service booking request based on service attribute information that holds a correspondence relationship between the service type and the logical resource; and a sixth step of deciding allocation of a physical resource fulfilling the decided logical resource based on resource management information that holds a correspondence relationship between the logical resource, the physical resource and an attribute of the physical resource, wherein the logical resource specifies an attribute of the physical resource necessary for implementing a service specified by the service type.

8. A service reservation taking method for receiving from users, connected to a network the reservation for utilizing services supplied by using resources, comprising:

a first step of accepting service reservation booking requests from the users in accordance with a degree of importance of the service booking requests, said degree of importance being determined based on attributes of the users, status information of the services including load level and social factors and attributes of the services, wherein said attributes of the users include for each user information of a position on the network to which the user is connected and an identifier of the services to which the user has subscribed, wherein said attributes of the services include for each service an attribute of a logic resource used by the service and an identifier and attribute of a replacement logic resource to be used in place of the logic resource as needed;

a second step of preparing at least one substitute reservation plan which is obtained by altering at least one condition-variable among condition-variables of a resource search condition equation which constitutes the content of reservation in the reservation booking requests accepted by the first acceptance element, in such a manner that a general resources utilization efficiency increases in accordance with the contents of the reservation and a load level of resources used for supplying of the object services relative to the reservation condition;

a third step of presenting said at least one substitute reservation plan to the users;

a fourth step of accepting the user's selection of said at least one substitute reservation plan;

a fifth step of accepting as reservation the substitute reservation plan selected by the users, wherein said resources include a transmission and exchange a network adapted by supply transmission and exchange service to the users, and a data processing unit adapted to supply the users with information processing and accumulating services via said transmission and exchange network;

a seventh step of deciding a logical resource corresponding to a service type that includes a service booking request based on service attribute information that holds a correspondence relationship between the service type and the logical resource; and a eight step of deciding allocation of a physical resource fulfilling the decided logical resource based on resource management information that holds a correspondence relationship between the logical resource, the physical resource and an attribute of the physical resource, wherein the logical resource specifies an attribute of the physical resource necessary for implementing a service specified by the service type.

9. A recording medium storing therein a program read and executed by an electronic computer, said program comprising a program for constituting on the electronic computer a service reservation system adapted to accept from users, connected to a network reservation for the utilization of services supplied by using resources, said service reservation system including:

a reservation condition management element adapted to manage the accepted reservation of services as reservation conditions, thereby controlling the resources which supply the services;

a first acceptance adapted to accept service booking requests from users;

an importance degree determining element adapted to determine, in accordance with an attribute of the users, status information of the services including load level and social factors and attributes of the services, a degree of importance of the service booking requests accepted by the first acceptance element, wherein said attributes of the users include for each user information of a position on the network to which the user is connected and an identifier of the services to which the user has subscribed, wherein said attributes of the services include for each service an attribute of a logic resource used by the service and an identifier and attribute of a replacement logic resource to be used in place of the logic resource as needed;

a reservation taking element adapted to, when a load level, which is determined depending upon the reservation condition managed by the reservation condition management element, of resources used for supplying object services relative to the service booking requests accepted by the first acceptance element is higher than a predetermined level, deny the acceptance of the service booking requests if the degree of importance of the service booking requests determined by the importance degree determining element is lower than a predetermined importance degree determined by a predetermined standard and permit the acceptance of the service booking requests if the degree of importance of the service booking requests determined by the importance degree determining element is not lower than the predetermined importance degree;

a service resource allotting element adapted to select a combination among combinations of the resources which includes data accumulation resources, data transmission resources and data processing resources to allot resources which constitute the combination thus selected to the reservation of the service whose reservation was taken, wherein said data transmission resources are adapted to supply transmission and exchange service to the users, wherein said data processing resources are adapted to supply the users with information processing service via the transmission and exchange service, wherein said data accumulation resources are adapted to supply the users with information accumulating service via the transmission and exchange service;

means for deciding a logical resource corresponding to a service type that includes a service booking request based on service attribute information that holds a correspondence relationship between the service type and the logical resource; and means for deciding allocation of a physical resource fulfilling the decided logical resource based on resource management information that holds a correspondence relationship between the logical resource, the physical resource and an attribute of the physical resource, wherein the logical resource specifies an attribute of the physical resource necessary for implementing a service specified by the service type.

10. A recording medium storing therein a program read and executed by an electronic computer, said program comprising a program for constituting on the electronic computer a service reservation system adapted to accept from users, connected to a network reservation for the utilization of services supplied by using resources, said service reservation system including:

a reservation condition management element adapted to manage accepted reservations of services as reservation condition, thereby controlling the resources which supply the services;

a first acceptance element adapted to accept service booking requests form users in accordance with a degree of importance of the service booking requests, said degree of importance being determined based on attributes of the users, status information of the services including load level and social factors and attributes of the services, wherein said attributes of the users include for each user information of a position on the network to which the user is connected and an identifier of the services to which the user has subscribed, wherein said attributes of the services include for each service an attribute of a logic resource used by the service and an identifier and attribute of a replacement logic resource to be used in place of the logic resource as needed;

a substitute reservation plan preparation element adapted to prepare by altering at least one condition-variable among condition-variables of a resource search condition equation which constitutes the content of reservation in the reservation booking requests accepted by the first acceptance element, in such a manner that a general resources utilization efficiency increases in accordance with the contents of the reservation and a load level of resources used for supplying of the object services relative to the reservation booking requests, said load level being determined by the reservation condition managed by the reservation condition management element;

a substitute reservation plan presentation element adapted to present said at least one substitute reservation plan which is prepared by the substitute reservation plan preparation element, to the users;

a second acceptance element adapted to accept the user's selection of said at least one substitute reservation plan;

a reservation element adapted to accept as reservation the substitute reservation plan whose selection is accepted by the second acceptance element, wherein said resources include a transmission and exchange network adapted to supply transmission and exchange service to the users, and a data processing unit adapted to supply the users with information processing and accumulating services via said transmission and exchange network;

means for deciding a logical resource corresponding to a service type that includes a service booking request based on service attribute information that holds a correspondence relationship between the service type and the logical resource; and means for deciding allocation of a physical resource fulfilling the decided logical resource based on resource management information that holds a correspondence relationship between the logical resource, the physical resource and an attribute of the physical resource, wherein the logical resource specifies an attribute of the physical resource necessary for implementing a service specified by the service type.

* * * * *